US010737378B2

(12) United States Patent
Akaha et al.

(10) Patent No.: US 10,737,378 B2
(45) Date of Patent: Aug. 11, 2020

(54) ROBOT AND ROBOT SYSTEM

(71) Applicant: Seiko Epson Corporation, Tokyo (JP)

(72) Inventors: Kazushige Akaha, Azumino (JP);
Christoph Meyerhoff, Krefeld (DE);
Kazuto Yoshimura, Matsumoto (JP)

(73) Assignee: Seiko Epson Corporation (JP)

( * ) Notice: Subject to any disclaimer, the term of this patent is extended or adjusted under 35 U.S.C. 154(b) by 326 days.

(21) Appl. No.: 15/515,414

(22) PCT Filed: Sep. 25, 2015

(86) PCT No.: PCT/JP2015/004877
§ 371 (c)(1),
(2) Date: Mar. 29, 2017

(87) PCT Pub. No.: WO2016/051746
PCT Pub. Date: Apr. 7, 2016

(65) Prior Publication Data
US 2017/0225326 A1 Aug. 10, 2017

(30) Foreign Application Priority Data

Sep. 30, 2014 (JP) .................. 2014-202060
Nov. 21, 2014 (JP) .................. 2014-236300

(51) Int. Cl.
*B25J 9/04* (2006.01)
*B25J 9/00* (2006.01)
(52) U.S. Cl.
CPC ........... *B25J 9/0009* (2013.01); *B25J 9/0018* (2013.01); *B25J 9/046* (2013.01)

(58) Field of Classification Search
CPC ... B25J 9/045; B25J 9/046; B25J 9/047; B25J 17/025; B25J 21/005; B25J 9/009; B25J 9/0018
(Continued)

(56) References Cited

U.S. PATENT DOCUMENTS 5,222,198 A * 6/1993 Yamamoto ............... B25J 9/046
318/568.15
5,357,824 A 10/1994 Hashimoto
(Continued)

FOREIGN PATENT DOCUMENTS

EP 2671687 A2 12/2013
GB 2045720 A * 11/1980 ................ B25J 5/02
(Continued)

OTHER PUBLICATIONS

Extended European Search Report for Patent Application No. EP 15847238.1, dated May 4, 2018 (13 pages).

*Primary Examiner* — Saul Rodriguez
*Assistant Examiner* — Brendan P Tighe
(74) *Attorney, Agent, or Firm* — Harness, Dickey & Pierce, P.L.C.

(57) ABSTRACT

A robot includes: a base; a first arm which is provided on the base so as to be rotatable around a first rotation axis; and a second arm which is provided on the first arm so as to be rotatable around a second rotation axis having an axial direction different from the axial direction of the first rotation axis, an angle formed by the first arm and the second arm is set as 0°, when seen in the axial direction of the second rotation axis, and the second arm does not interfere with an attachment surface where the base is provided, when the angle is 0°.

9 Claims, 25 Drawing Sheets

(58) Field of Classification Search
USPC .................. 414/732, 735, 738, 739, 740
See application file for complete search history.

(56) References Cited

U.S. PATENT DOCUMENTS

| | | | |
|---|---|---|---|
| 6,105,454 | A | 8/2000 | Bacchi et al. |
| 2003/0221504 | A1* | 12/2003 | Stoianovici ............... B25J 9/06 74/490.04 |
| 2006/0074406 | A1 | 4/2006 | Cooper et al. |
| 2009/0041565 | A1 | 2/2009 | Rodriguez Y Baena |
| 2013/0041509 | A1 | 2/2013 | Saito et al. |
| 2013/0086801 | A1 | 4/2013 | Mimura et al. |
| 2013/0145893 | A1 | 6/2013 | Kumagai et al. |
| 2013/0325032 | A1 | 12/2013 | Schena et al. |
| 2013/0331989 | A1 | 12/2013 | Umeno et al. |
| 2014/0067120 | A1* | 3/2014 | Gomi ................... B25J 9/1638 700/254 |
| 2014/0178156 | A1 | 6/2014 | Yoshida et al. |

FOREIGN PATENT DOCUMENTS

| | | |
|---|---|---|
| GB | 2 131 390 A | 6/1984 |
| JP | 59-232779 A | 12/1984 |
| JP | 61-152380 A | 7/1986 |
| JP | S63-251180 A | 10/1988 |
| JP | 01-257579 A | 10/1989 |
| JP | 04-005386 U | 1/1992 |
| JP | H07-060663 A | 3/1995 |
| JP | 09-141592 A | 6/1997 |
| JP | 2002-137181 A | 5/2002 |
| JP | 2010-046773 A | 3/2010 |
| JP | 2011-051056 A | 3/2011 |
| JP | 2011-520633 A | 7/2011 |
| JP | 2011-224663 A | 11/2011 |
| JP | 2013-252601 A | 12/2013 |
| JP | 2014-046401 A | 3/2014 |
| JP | 2014-117789 A | 6/2014 |
| JP | 2014-121750 A | 7/2014 |
| KR | 94-0007206 B1 | 8/1994 |
| KR | 10-2013-0044306 A | 5/2013 |
| WO | WO-2009-104853 A1 | 8/2009 |
| WO | WO-2009-140547 A1 | 11/2009 |
| WO | WO-2012-029174 A1 | 3/2012 |
| WO | WO-2012-104895 A1 | 8/2012 |

* cited by examiner

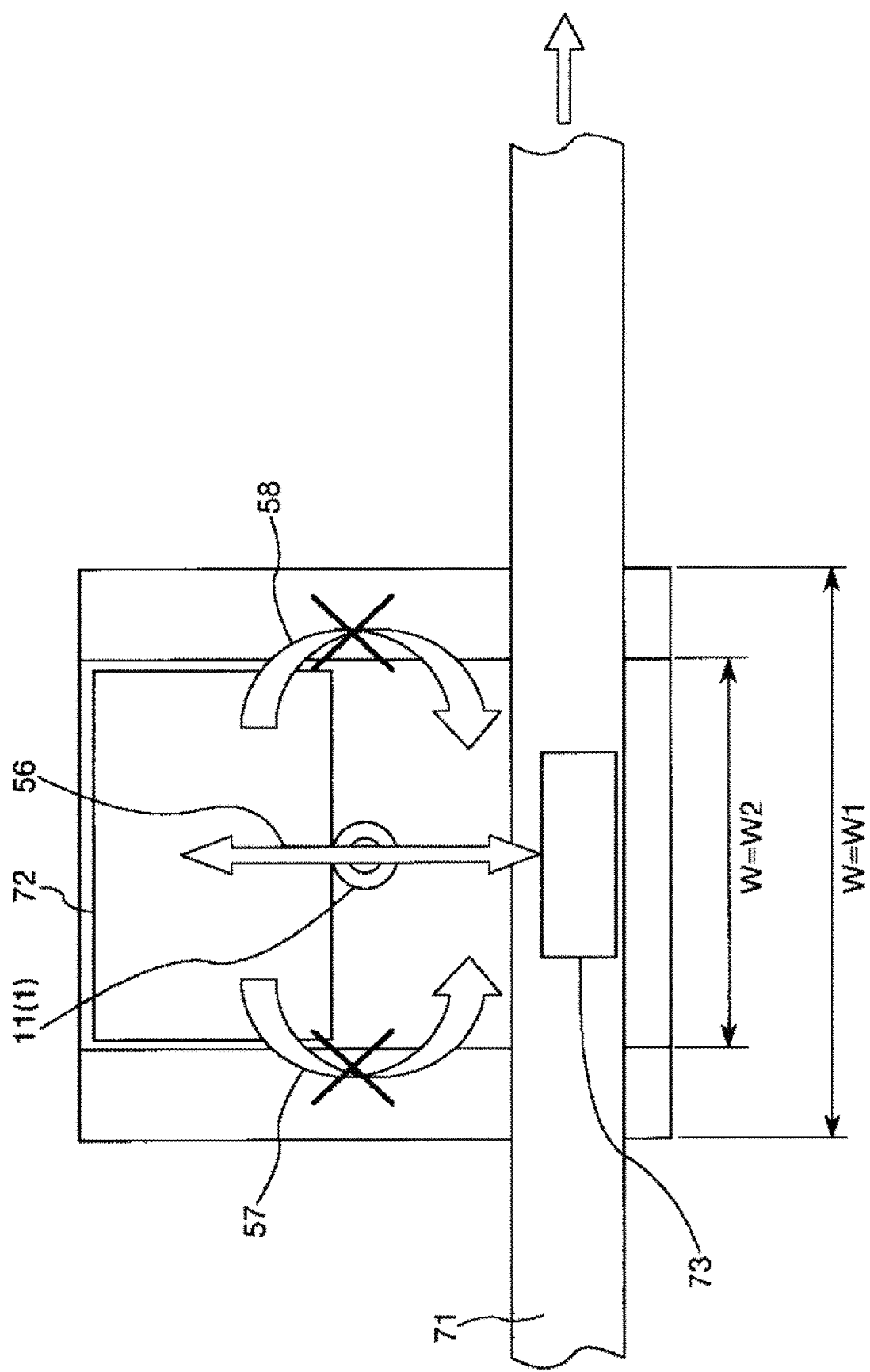

ROBOT AND ROBOT SYSTEM

This application is a U.S. National Phase Application of International Application No. PCT/JP2015/004877, filed on Sep. 25, 2015 and published in English as WO 2016/051746 A1 on Apr. 7, 2016, which claims priority to Japanese Patent Application No. 2014-236300, filed on Nov. 21, 2014 and No. 2014-202060, filed on Sep. 30, 2014. The entire disclosures of the above referenced applications are expressly incorporated by reference herein.

TECHNICAL FIELD

The present invention relates to a robot and a robot system.

BACKGROUND ART

In the related art, a robot including a robot arm has been known. As the robot arm, a plurality of arms (arm members) are connected to each other through joints, and a hand is mounted on the arm on an endmost side (lowermost stream) as an end effector, for example. The joint is driven by a motor and the arm rotates by the driving of the joint. The robot grasps a target with a hand, for example, moves the target to a predetermined place, and performs a predetermined operation such as assembly.

As such a robot, JP-A-2014-46401 discloses a vertically articulated robot. In the robot disclosed in JP-A-2014-46401, a motion for moving a hand to a position rotated by 180° around a first rotation axis which is a rotation axis (rotation axis extending in a vertical direction) disposed furthest on the proximal side (uppermost stream) with respect to a base is performed by rotating a first arm which is an arm disposed furthest on the proximal side with respect to the base around the first rotation axis.

In the robot disclosed in JP-A-2014-46401, when the hand is moved to the position rotated by 180° around the first rotation axis with respect to the base, it is necessary to provide a space having a size for avoiding interference of the robot.

Currently, a production line in which a cell for an operation by a person is replaced with a robot cell for an operation by a robot has been increased. However, a size of the robot cell for an operation by a robot is generally larger than a size of the cell for an operation by a person and the production line becomes long when the cell for an operation by a person is simply replaced with the robot cell for an operation by a robot, and accordingly, the replacement is hardly executed depending on a production site.

In addition, a height of the robot cell for an operation by a robot is great, and accordingly, when a plurality of robot cells are provided in a line, persons are hidden and accordingly, visibility is poor in the production site. When the height of the robot cell for an operation by a robot is great, the center of gravity of the robot cell becomes high and it is easily vibrated. Accordingly, the operation accuracy of the robot becomes poor and a risk of the robot cell falling down becomes high.

SUMMARY

An advantage of some aspects of the invention is to solve at least apart of the problems described above and the invention can be implemented as the following forms or application examples.

Application Example 1

A robot according to this application example of the invention includes: a base; a first arm which is provided on the base so as to be rotatable around a first rotation axis; and a second arm which is provided on the first arm so as to be rotatable around a second rotation axis having an axial direction different from the axial direction of the first rotation axis, in which an angle formed by the first arm and the second arm is set as 0°, when seen in the axial direction of the second rotation axis, and the second arm does not interfere with an attachment surface where the base is provided, when the angle is 0°.

With this configuration, it is possible to reduce a space for avoiding interference of the robot, when the distal end of the second arm is moved to a position rotated by 180° around the first rotation axis.

Application Example 2

A robot according to this application example of the invention includes: a base; a first arm which is provided on the base so as to be rotatable around a first rotation axis; and a second arm which is provided on the first arm so as to be rotatable around a second rotation axis having an axial direction different from the axial direction of the first rotation axis, in which the first arm has a length which is greater than the length of the second arm.

With this configuration, it is possible to reduce a space for avoiding interference of the robot, when the distal end of the second arm is moved to a position rotated by 180° around the first rotation axis.

Application Example 3

A robot according to this application example of the invention includes: a base; and a robot arm, in which the robot arm includes a first arm which is provided on the base so as to be rotatable around a first rotation axis, and a second arm which is provided on the first arm so as to be rotatable around a second rotation axis having an axial direction different from the axial direction of the first rotation axis, in which the distal end of the robot arm is moved from a first position to a second position which is rotated by 180° around the first rotation axis, through a state where an angle formed by the first arm and the second arm is set as 0° when seen in the axial direction of the second rotation axis, by not rotating the first arm but rotating the second arm.

With this configuration, it is possible to reduce a space for avoiding interference of the robot, when the distal end of the robot arm is moved from the first position to the second position.

Application Example 4

In the robot according to the application example, it is preferable that when the distal end of the robot arm moves from the first position to the second position, the distal end of the robot arm moves on the straight line, when seen in the axial direction of the first rotation axis.

With this configuration, it is possible to reduce a space for avoiding interference of the robot, when the distal end of the robot arm is moved from the first position to the second position.

Application Example 5

In the robot according to the application example, it is preferable that the distal end of the robot arm is moved from the first position to a third position having the same height as that of the first position and moves the distal end of the robot arm from the third position to the second position.

With this configuration, it is possible to move a work piece which is disposed on the first position to the second position while preventing interference with an object, when an object exists on the upper portion and the lower portion in the first position.

Application Example 6

In the robot according to the application example, it is preferable that the distal end of the robot arm is moved from the second position to a third position having the same height as that of the first position and moves the distal end of the robot arm from the third position to the first position.

With this configuration, it is possible to move a work piece which is disposed on the second position to the first position while preventing interference with an object, when an object exists on the upper portion and the lower portion in the first position.

Application Example 7

A robot according to this application example of the invention includes: a base; a first arm which is provided on the base so as to be rotatable around a first rotation axis; and a second arm which is provided on the first arm so as to be rotatable around a second rotation axis having an axial direction different from the axial direction of the first rotation axis, in which the first arm and the second arm are overlapped each other when seen in the axial direction of the second rotation axis.

With this configuration, it is possible to reduce a space for avoiding interference of the robot, when the distal end of the second arm is moved to a position rotated by 180° around the first rotation axis.

Application Example 8

In the robot according to the application example, it is preferable that the second rotation axis is separate from the first rotation axis.

With this configuration, it is possible to move the distal end of the second arm to a position separated from the first rotation axis, by an amount separated between the first rotation axis and the second rotation axis.

Application Example 9

In the robot according to the application example, it is preferable that the robot further includes a third arm which is provided on the second arm so as to be rotatable around a third rotation axis.

With this configuration, it is possible to easily realize a more complicated motion.

Application Example 10

In the robot according to the application example, it is preferable that the axial direction of the third rotation axis and the axial direction of the second rotation axis are parallel with each other.

With this configuration, it is possible to easily realize a more complicated motion.

Application Example 11

In the robot according to the application example, it is preferable that the third arm has a length which is greater than the length of the second arm.

With this configuration, it is possible to cause the distal end of the third arm to be protruded from the second arm, when the second arm and the third arm overlap each other, when seen in the axial direction of the second rotation axis.

Application Example 12

In the robot according to the application example, it is preferable that the second arm and the third arm overlap each other when seen in the axial direction of the second rotation axis.

With this configuration, it is possible to reduce a space for avoiding interference of the robot, when the distal end of the second arm is moved to a position rotated by 180° around the first rotation axis.

Application Example 13

In the robot according to the application example, it is preferable that the base is provided on a ceiling.

With this configuration, it is possible to provide a robot which is installed on a ceiling.

Application Example 14

In the robot according to the application example, it is preferable that the third arm includes a first link which is provided on the second arm so as to be rotatable around the third rotation axis, a second link which is provided on the first link so as to be rotatable around a fourth rotation axis having an axial direction which is different from an axial direction of the third rotation axis, a third link which is provided on the second link so as to be rotatable around a fifth rotation axis having an axial direction which is different from an axial direction of the fourth rotation axis, and a fourth link which is provided on the third link so as to be rotatable around a sixth rotation axis having an axial direction which is different from an axial direction of the fifth rotation axis.

With this configuration, it is possible to easily realize a more complicated motion.

Application Example 15

A robot system according to this application example of the invention includes: a robot; and a robot cell where the robot is provided, in which the robot cell has a height equal to or smaller than 1,700 mm.

With this configuration, when the cell is replaced with the robot cell, the height thereof is smaller than the height of the cell of the related art, and accordingly, it is possible to check operators operating in other cells.

Application Example 16

In the robot system according to the application example, it is preferable that the height of the robot cell is from 1,000 mm to 1,650 mm.

With this configuration, it is possible to prevent the effects of vibration when the robot is operated in the robot cell.

Application Example 17

In the robot system according to the application example, it is preferable that the robot cell has an installation area of less than 637,500 mm².

With this configuration, it is possible to increase the number of production lines and to prevent long production lines.

Application Example 18

In the robot system according to the application example, it is preferable that the installation area of the robot cell is equal to or smaller than 500,000 mm².

With this configuration, it is possible to further prevent a long production line.

Application Example 19

In the robot system according to the application example, it is preferable that the installation area of the robot cell is equal to or smaller than 400,000 mm².

With this configuration, the installation area of the robot cell becomes the installation area having substantially the same or equal to or smaller than the cell for an operation of an operator, and accordingly, it is possible to easily replace the cell for an operation of an operator to the robot cell.

Application Example 20

In the robot system according to the application example, it is preferable that a volume ratio of the robot with respect to a volume of the robot cell is from 0.01 to 0.5.

With this configuration, by increasing the volume ratio which is equal to or greater than 0.01, because the volume ratio of the related art is equal to or smaller than 0.01, it is possible to realize space saving of the robot cell and to make the operations efficient.

Application Example 21

In the robot system according to the application example, it is preferable that the volume ratio of the robot with respect to the volume of the robot cell is from 0.01 to 0.1.

With this configuration, it is possible to widen a movable range of the robot, compared to a case where the volume ratio is equal to or smaller than 0.5.

Application Example 22

In the robot system according to the application example, it is preferable that the robot has a weight equal to or smaller than 20 kg.

With this configuration, it is possible to prevent an effect of vibration when the robot is operated in the robot cell.

Application Example 23

In the robot system according to the application example, it is preferable that the robot includes a base provided in the robot cell, a first arm which is provided on the base so as to be rotatable around a first rotation axis, and a second arm which is provided on the first arm so as to be rotatable around a second rotation axis having an axial direction different from the axial direction of the first rotation axis, and the first arm has a length which is greater than the length of the second arm.

With this configuration, it is possible to effectively perform the operation in a small space such as the robot cell.

BRIEF DESCRIPTION OF DRAWINGS

FIG. 6 is a diagram for illustrating a motion at the time of an operation of the robot shown in FIG. 1.

DESCRIPTION OF EMBODIMENTS

Hereinafter, a robot according to the invention will be described in detail based on preferred embodiments shown in the accompanying drawings.

First Embodiment

Figure 1:
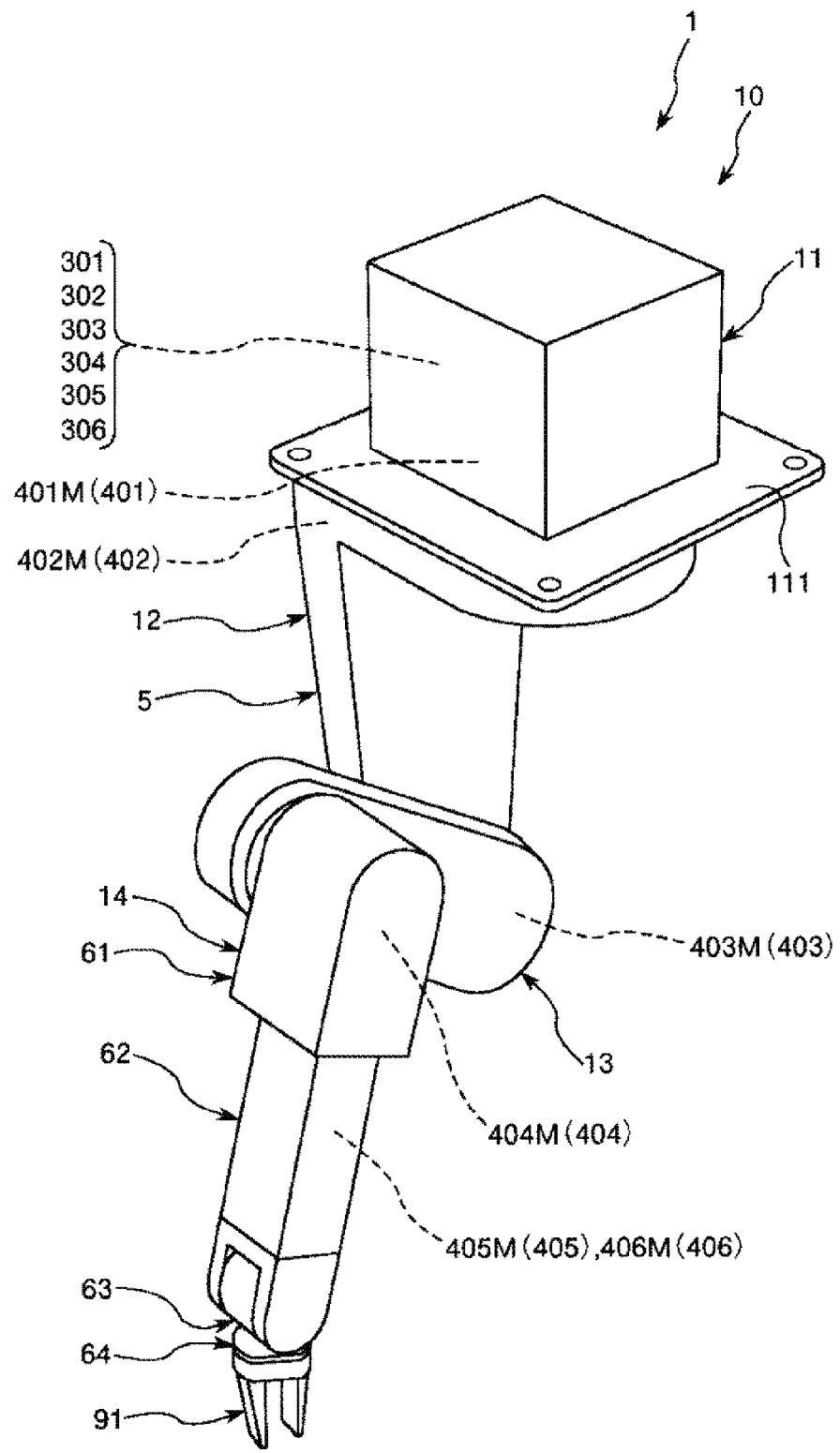
FIG. 1 is a perspective view showing a first embodiment of a robot according to the invention.
Figure 2:
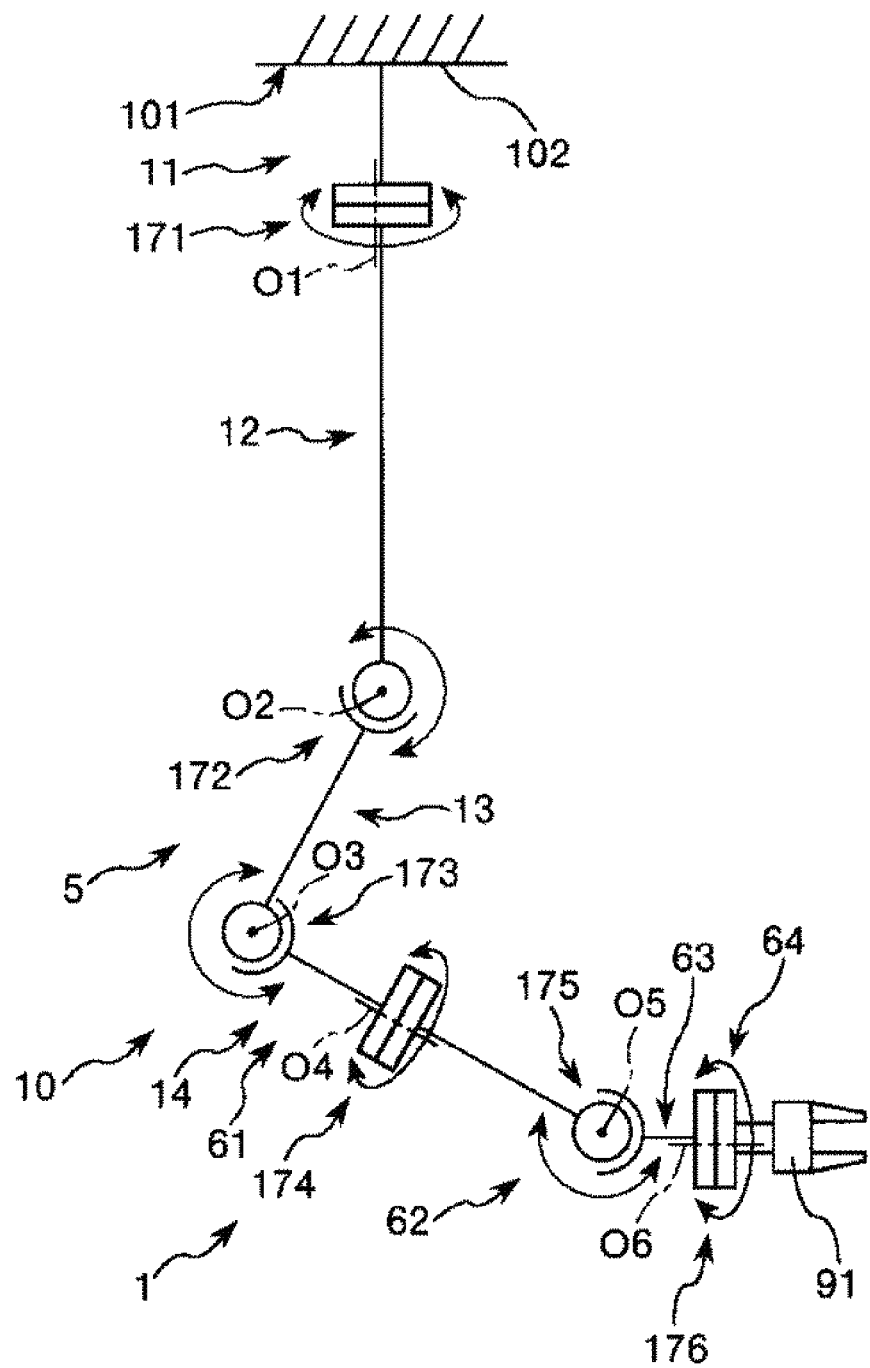
FIG. 2 is a schematic diagram of the robot shown in FIG. 1.
Figure 3:
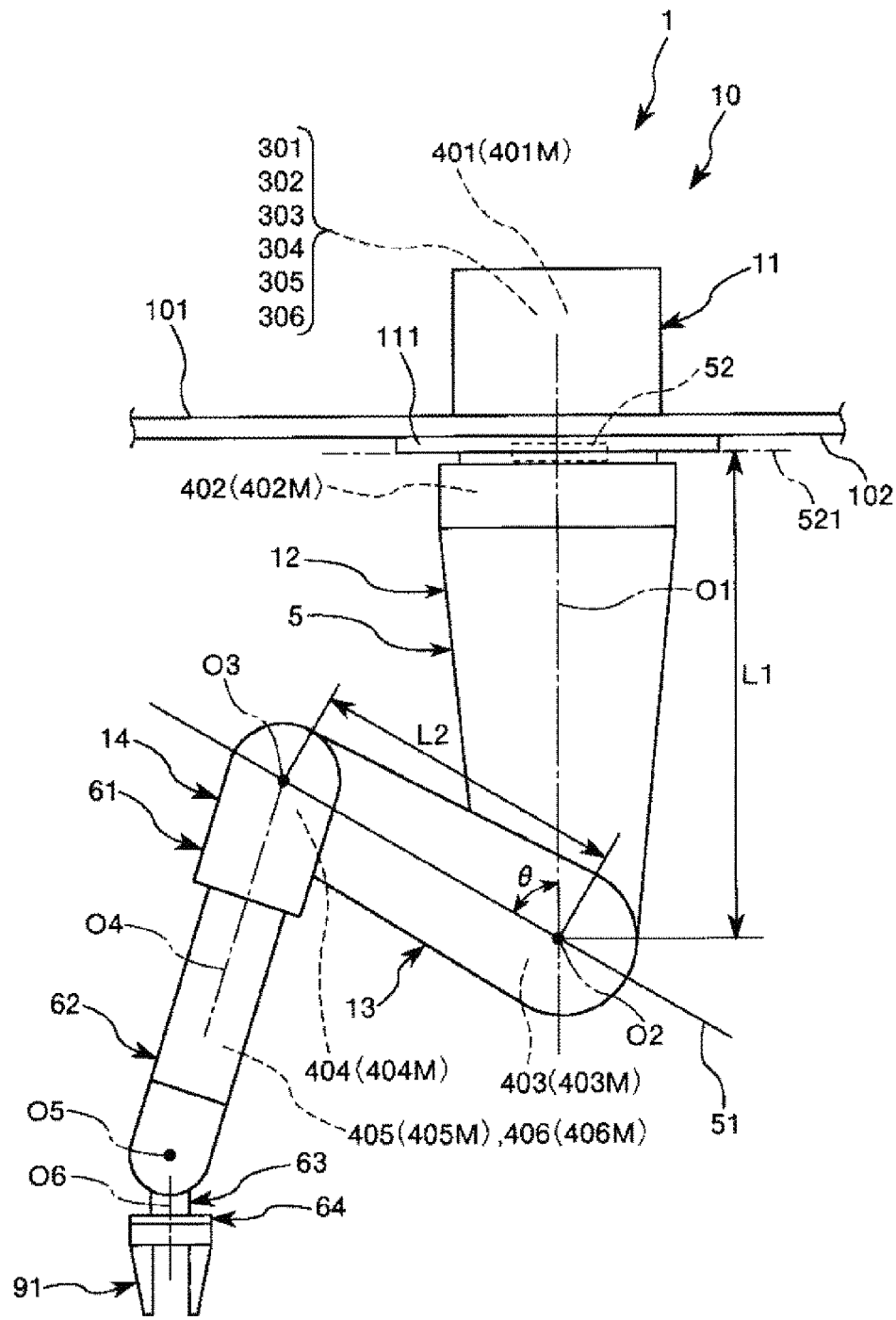
FIG. 3 is a front view of the robot shown in FIG. 1.
Figure 4:
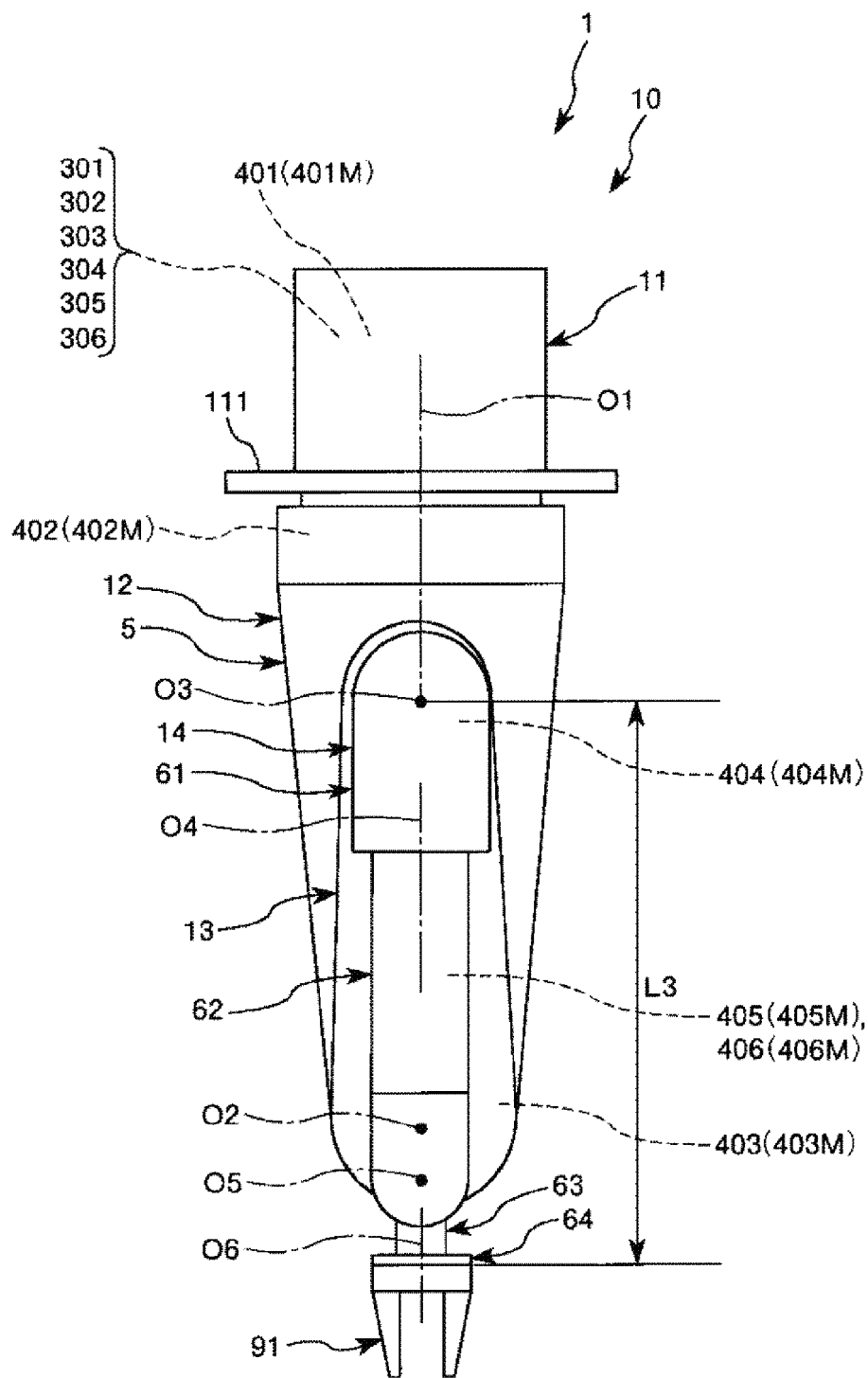
FIG. 4 is a front view of the robot shown in FIG. 1.
Figure 5:
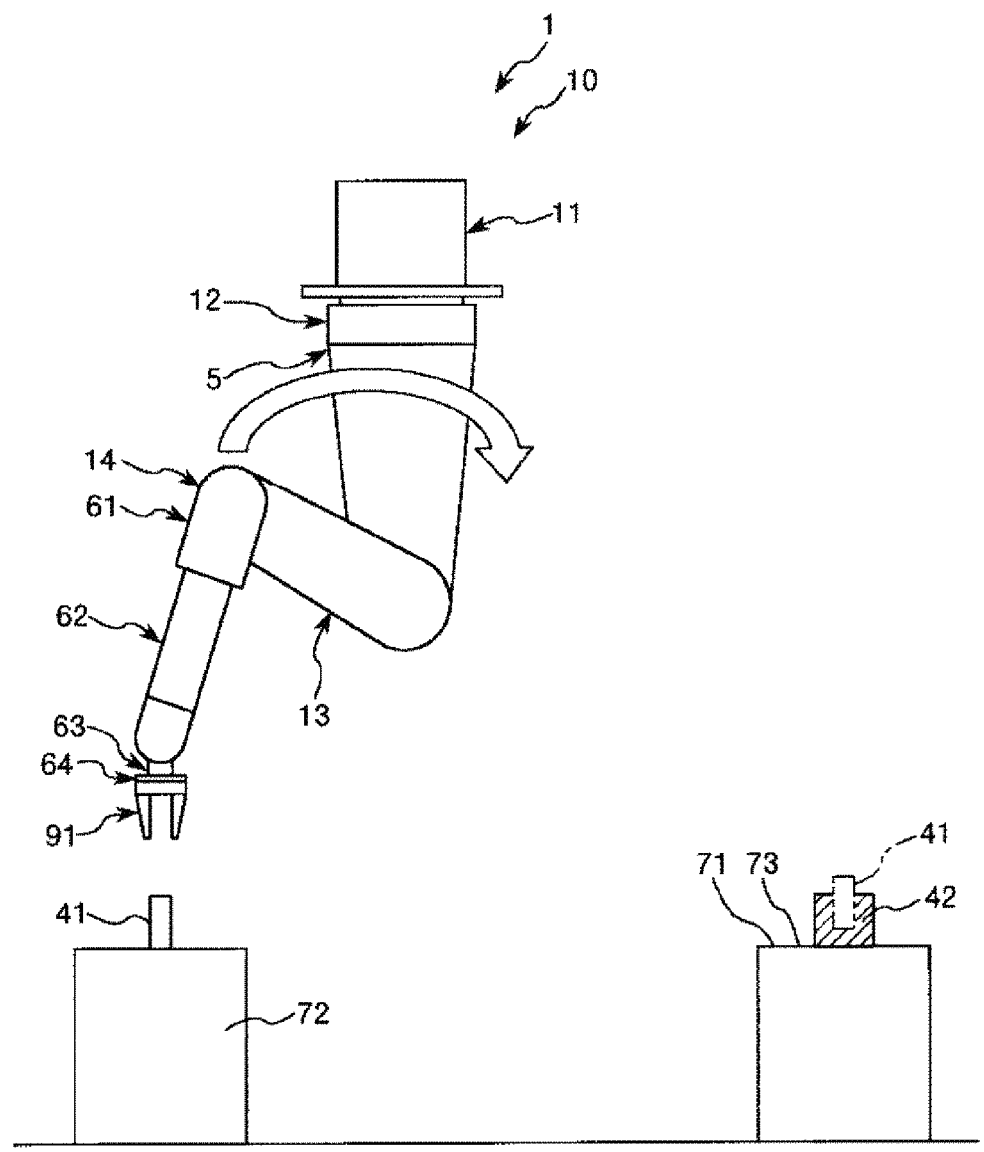
FIG. 5 is a diagram for illustrating a motion at the time of an operation of the robot shown in FIG. 1.

FIG. 1 is a perspective view showing a first embodiment of a robot according to the invention. FIG. 2 is a schematic diagram of the robot shown in FIG. 1. FIGS. 3 and 4 are front views of the robot shown in FIG. 1. FIGS. 5, 6, and 7 are respectively diagrams for illustrating a motion at the time of an operation of the robot shown in FIG. 1.

Hereinafter, for convenience of description, the upper side in FIGS. 1, 2, 3 to 5, and 7 is described with a term "on" or an "upper portion" and the lower side thereof is described with a term "below" or a "lower portion" (the same also applies to a case of FIGS. 8 to 14 of other embodiments), and the base side in FIGS. 1, 2, 3 to 5, and 7 is described with a term "proximal end" or "upstream" and the opposite side thereof (hand side) is described with a term "distal end" or "downstream" (the same also applies to a case of FIGS. 8 to 14 of other embodiments).

A robot (industrial robot) 1 shown in FIGS. 1 to 4 includes a robot main body (main body portion) 10 and a robot control device (control unit) (not shown) which controls an operation of the robot main body 10 (robot 1). The robot 1, for example, can be used in a manufacturing step of manufacturing a precision instrument such as a watch. The robot control device may be embedded in the robot main body 10 (robot 1) or may be separate from the robot main body 10. In addition, the robot control device, for example, can be configured with a personal computer (PC) in which a central processing unit (CPU) is embedded, for example.

The robot main body 10 includes a base (support) 11 and a robot arm 5. The robot arm 5 includes a first arm (first arm member) (arm portion) 12 including one link, a second arm (second arm member) (arm portion) 13 including one link, a third arm (third arm member) (arm portion) 14 including a first link 61, a second link 62, a third link 63, and a fourth link 64 (four links), a first driving source 401, a second driving source 402, a third driving source 403, a fourth driving source 404, a fifth driving source 405, and a sixth driving source 406 (six driving sources). The wrist is configured with the third link 63 and the fourth link 64 of the third arm and an end effector such as a hand 91 or the like can be detachable from a distal end of the fourth link 64 of the third arm, for example (see FIG. 1). That is, the robot 1 is a vertically articulated (six axes) robot in which the base 11, the first arm 12, the second arm 13, the first link 61, the second link 62, the third link 63, and the fourth link 64 are connected to each other in this order form the proximal side to the distal side. Hereinafter, the first arm 12, the second arm 13, and the third arm 14 are also respectively referred to as the "arm". In addition, the first link 61, the second link 62, the third link 63, and the fourth link 64 are also respectively referred to as the "link". Further, the first driving source 401, the second driving source 402, the third driving source 403, the fourth driving source 404, the fifth driving source 405, and the sixth driving source 406 are also respectively referred to as the "driving source".

As shown in FIGS. 1, 2, and 3, in a case where the robot 1 is a vertically articulated robot, the base 11 is positioned on the uppermost side of the vertically articulated robot and is a portion which is fixed to (member which is attached to) an attachment surface 102 which is a lower surface of a ceiling 101 of an installation space. The fixing method thereof is not particularly limited and a fixing method performed with a plurality of bolts can be used, for example.

A location for the base 11 attached to the attachment surface 102 is not particularly limited, but in the embodiment, any portion of a plate-shaped flange 111 provided on the lower portion of the base 11 and an upper surface of the base 11 can be used.

The portion where the base 11 is fixed is not particularly limited to a ceiling of the installation space and in addition thereto, a wall of the installation space, a floor, or the ground is used, for example.

A first joint 171 which will be described later may be contained or not be contained in the base 11.

The first arm 12, the second arm 13, the first link 61, the second link 62, the third link 63, and the fourth link 64 are respectively supported so as to be independently displaced with respect to the base 11.

As shown in FIGS. 1, 2, and 3, the base 11 and the first arm 12 are connected to each other through the joint 171. The joint 171 has a mechanism of supporting the first arm 12 connected to the base 11 to be rotatable with respect to the base. Accordingly, the first arm 12 can rotate around a first rotation axis O1 parallel to a vertical direction, with respect to the base 11. The first rotation axis O1 coincides with a lower surface of the ceiling 101 to which the base 11 is attached, that is, a normal line of the attachment surface 102 of the ceiling 101. The first rotation axis O1 is a rotation axis which is on the uppermost stream of the robot 1. The rotation around the first rotation axis O1 is performed by the driving of the first driving source 401 including a motor 401M. The first driving source 401 is driven by the motor 401M and a cable (not shown) and this motor 401M is controlled by the robot control device through an electrically connected motor driver 301. The first driving source 401 may be configured to transmit a driving force of the motor 401M by a reduction gear (not shown) which is provided with the motor 401M, and the reduction gear may be omitted.

The first arm 12 and the second arm 13 are connected to each other through a joint 172. The joint 172 has a mechanism of supporting one of the first arm 12 and the second arm 13 connected to each other to be rotatable with respect to the other one. Accordingly, the second arm 13 can rotate around a second rotation axis O2 parallel to a horizontal direction, with respect to the first arm 12. The second rotation axis O2 is orthogonal to the first rotation axis O1. The rotation around the second rotation axis O2 is performed by the driving of the second driving source 402 including a motor 402M. The second driving source 402 is driven by the motor 402M and a cable (not shown) and this motor 402M is controlled by the robot control device through an electrically connected motor driver 302. The second driving source 402 may be configured to transmit a driving force from the motor 402M by a reduction gear (not shown) which is provided with the motor 402M, and the reduction gear may be omitted. The second rotation axis O2 may be parallel to an axis orthogonal to the first rotation axis O1 or when the second rotation axis O2 is not orthogonal to the first rotation axis O1, axial directions thereof may be different from each other.

The second arm 13 and the first link 61 of the third arm 14 are connected to each other through a joint 173. The joint 173 has a mechanism of supporting one of the second arm 13 and the first link 61 connected to each other to be rotatable with respect to the other one. Accordingly, the first link 61 can rotate around a third rotation axis O3 parallel to the horizontal direction, with respect to the second arm 13. The third rotation axis O3 is parallel to the second rotation axis O2. The rotation around the third rotation axis O3 is performed by the driving of the third driving source 403. The third driving source 403 is driven by a motor 403M and a cable (not shown) and the motor 403M is controlled by the robot control device through an electrically connected motor driver 303. The third driving source 403 may be configured to transmit a driving force from the motor 403M by a reduction gear (not shown) which is provided with the motor 403M, and the reduction gear may be omitted.

The first link 61 and the second link 62 are connected to each other through a joint 174. The joint 174 has a mechanism of supporting one of the first link 61 and the second link 62 connected to each other to be rotatable with respect to the other one. Accordingly, the second link 62 can rotate around a fourth rotation axis O4 parallel to a center axis direction of the first link 61, with respect to the first link 61 (base 11). The fourth rotation axis O4 is orthogonal to the third rotation axis O3. The rotation around the fourth rotation axis O4 is performed by the driving of the fourth driving source 404. The fourth driving source 404 is driven by a motor 404M and a cable (not shown) and the motor 404M is controlled by the robot control device through an electrically connected motor driver 304. The fourth driving source 404 may be configured to transmit a driving force from the motor 404M by a reduction gear (not shown) which is provided with the motor 404M, and the reduction gear may be omitted. The fourth rotation axis O4 may be parallel to an axis orthogonal to the third rotation axis O3 or when the fourth rotation axis O4 is not orthogonal to the third rotation axis O3, axial directions thereof may be different from each other.

The second link 62 and the third link 63 are connected to each other through a joint 175. The joint 175 has a mechanism of supporting one of the second link 62 and the third link 63 connected to each other to be rotatable with respect to the other one. Accordingly, the third link 63 can rotate around a fifth rotation axis O5 which is orthogonal to a center axis direction of the second link 62, with respect to the second link 62. The fifth rotation axis O5 is orthogonal to the fourth rotation axis O4. The rotation around the fifth rotation axis O5 is performed by the driving of the fifth driving source 405. The fifth driving source 405 is driven by a motor 405M and a cable (not shown) and the motor 405M is controlled by the robot control device through an electrically connected motor driver 305. The fifth driving source 405 may be configured to transmit a driving force from the motor 405M by a reduction gear (not shown) which is provided with the motor 405M, and the reduction gear may be omitted. The fifth rotation axis O5 may be parallel to an axis orthogonal to the fourth rotation axis O4 or when the fifth rotation axis O5 is not orthogonal to the fourth rotation axis O4, axial directions thereof may be different from each other.

The third link 63 and the fourth link 64 are connected to each other through a joint 176. The joint 176 has a mechanism of supporting one of the third link 63 and the fourth link 64 connected to each other to be rotatable with respect to the other one. Accordingly, the fourth link 64 can rotate around a sixth rotation axis O6 with respect to the third link 63. The sixth rotation axis O6 is orthogonal to the fifth rotation axis O5. The rotation around the sixth rotation axis O6 is performed by the driving of the sixth driving source 406. The sixth driving source 406 is driven by a motor 406M and a cable (not shown) and the motor 406M is controlled by the robot control device through an electrically connected motor driver 306. The sixth driving source 406 may be configured to transmit a driving force from the motor 406M by a reduction gear (not shown) which is provided with the motor 406M, or the reduction gear may be omitted. The fifth rotation axis O5 may be parallel to an axis orthogonal to the fourth rotation axis O4, the sixth rotation axis O6 may be parallel to an axis orthogonal to the fifth rotation axis O5, or when the sixth rotation axis O6 is not orthogonal to the fifth rotation axis O5, axial directions thereof may be different from each other.

The hand 91 which grasps a precision apparatus or a component such as a watch, is detachably attached to a distal end portion (end portion on the side opposite to the third link 63) of the fourth link 64, as an end effector, for example. The driving of this hand 91 is controlled by the robot control device. The configuration of the hand 91 is not particularly limited, and a configuration of including a plurality of fingers is used. The robot 1 can perform each operation of transporting the precision apparatus or component by controlling the motions of the arms 12 to 14 while grasping the precision apparatus or component by the hand 91.

Next, a relationship between the first arm 12, the second arm 13, and the third arm 14 will be described, but the description will be made from various viewpoints by changing expressions. In addition, the third arm 14 is considered in a state where the third arm 14 is extended straight, that is, a state where the third arm 14 is extended to a maximum length, that is, a state where the fourth rotation axis O4 and the sixth rotation axis O6 coincide with each other or are parallel to each other.

First, as shown in FIG. 3, a length L1 of the first arm 12 is set to be greater than a length L2 of the second arm 13.

Herein, the length L1 of the first arm 12 is a distance between the second rotation axis O2 and a center line 521 of a bearing 52 rotatably supporting the first arm 12, which extends in a vertical direction of FIG. 3, when seen in the axial direction of the second rotation axis O2.

The length L2 of the second arm 13 is a distance between the second rotation axis O2 and the third rotation axis O3, when seen in the axial direction of the second rotation axis O2.

As shown in FIG. 4, an angle q formed by the first arm 12 and the second arm 13 is configured so as to be set as 0°, when seen in the axial direction of the second rotation axis O2. That is, the first arm 12 and the second arm 13 are configured so as to overlap each other, when seen in the axial direction of the second rotation axis O2.

When an angle q of the second arm 13 is 0°, that is, when the first arm 12 and the second arm 13 overlap each other, when seen in the axial direction of the second rotation axis O2, the attachment surface 102 of the ceiling 101 on which the base 11 is provided does not cause interference.

Herein, the angle q formed by the first arm 12 and the second arm 13 is an angle formed by a linear line (center axis of the second arm 13 when seen in the axial direction of the second rotation axis O2) 51 passing through the second rotation axis O2 and the third rotation axis O3, and the first rotation axis O1, when seen in the axial direction of the second rotation axis O2.

By not rotating the first arm 12 but rotating the second arm 13, the distal end of the second arm 13 can be moved to a position rotated by 180° around the first rotation axis O1, through a state where the angle q is set as 0° (a state where the first arm 12 and the second arm 13 are overlapped each other) when seen in the axial direction of the second rotation axis O2 (see FIGS. 7A to 7E). That is, by not rotating the first arm 12 but rotating the second arm 13, the distal end of the robot arm 5 (distal end of the fourth link 64 of the third arm 14) can be moved from a first position shown in FIG. 7A to a second position shown in FIG. 7E which is rotated by 180° around the first rotation axis O1, through a state where the angle q is set as 0° (see FIGS. 7A to 7E). The first link 61, the second link 62, the third link 63, and the fourth link 64 of the third arm 14 respectively rotate, if necessary.

When moving the distal end of the second arm 13 to a position rotated by 180° around the first rotation axis O1 (when moving the distal end of the robot arm 5 from the first position to the second position), the distal end of the second arm 13 and the distal end of the robot arm 5 are moved on the linear line, when seen in the axial direction of the first rotation axis O1.

A length L3 of the third arm 14 is set to be greater than the length L2 of the second arm 13.

Accordingly, when the second arm 13 and the third arm 14 overlap each other, when seen in the axial direction of the second rotation axis O2, the distal end of the third arm 14, that is, the distal end of the fourth link 64 can be protruded from the second arm 13. Accordingly, it is possible to prevent the hand 91 from interfering with the first arm 12 and the second arm 13.

Herein, as shown in FIG. 4, the length L3 of the third arm 14 is the distance between the third rotation axis O3 and the distal end of the third arm 14 (distal end of the fourth link 64), when seen in the axial direction of the second rotation axis O2. The state of the third arm 14 in this case is a state where the third arm 14 is extended to a maximum length, that is, a state where the fourth rotation axis O4 and the sixth rotation axis O6 coincide with each other or are parallel to each other, that is, a state where the third arm 14 is extended straight.

As shown in FIG. 4, the second arm 13 and the third arm 14 can overlap each other, when seen in the axial direction of the second rotation axis O2.

That is, the first arm 12, the second arm 13, and the third arm 14 can overlap each other at the same time, when seen in the axial direction of the second rotation axis O2.

In the robot 1, by satisfying the relationship described above, the hand 91 (distal end of the third arm 14) can be moved to a position rotated by 180° around the first rotation axis O1, through a state where the angle q formed by the first arm 12 and the second arm 13 is set as 0° (a state where the first arm 12 and the second arm 13 overlap each other) when seen in the axial direction of the second rotation axis O2, by not rotating the first arm 12 but rotating the second arm 13 and the third arm 14. By using this operation, it is possible to drive the robot 1 with excellent efficiency and to reduce the space provided for avoiding interference with the robot 1, and various advantages which will be described later are obtained.

Next, operations such as the supply, removal, transportation, assembly, and the like regarding materials performed by the robot 1 and an example of a motion of the robot 1 at the time of operation will be described. Herein, a motion of the robot 1 when the robot 1 performs an assembly operation of inserting a component (work) disposed in a component supply portion to a component (work) transported by a belt conveyor will be described.

As shown in FIG. 6, in the robot 1, the base 11 is attached to the ceiling 101 so as to be positioned in the vicinity of a belt conveyor 71. The belt conveyor 71 may be a direct linear motion bearing used in belt driving or ball screw driving.

As shown in FIGS. 5 and 6, a predetermined component 42 is transported by the belt conveyor 71 at the time of the operation. The robot 1 inserts a component 41 disposed in a component supply portion 72 to the component 42 which is transported by the belt conveyor 71.

At that time, first, as shown in FIG. 5, the robot 1 grasps the component 41 disposed in the component supply portion 72 with the hand 91.

Figure 7A:
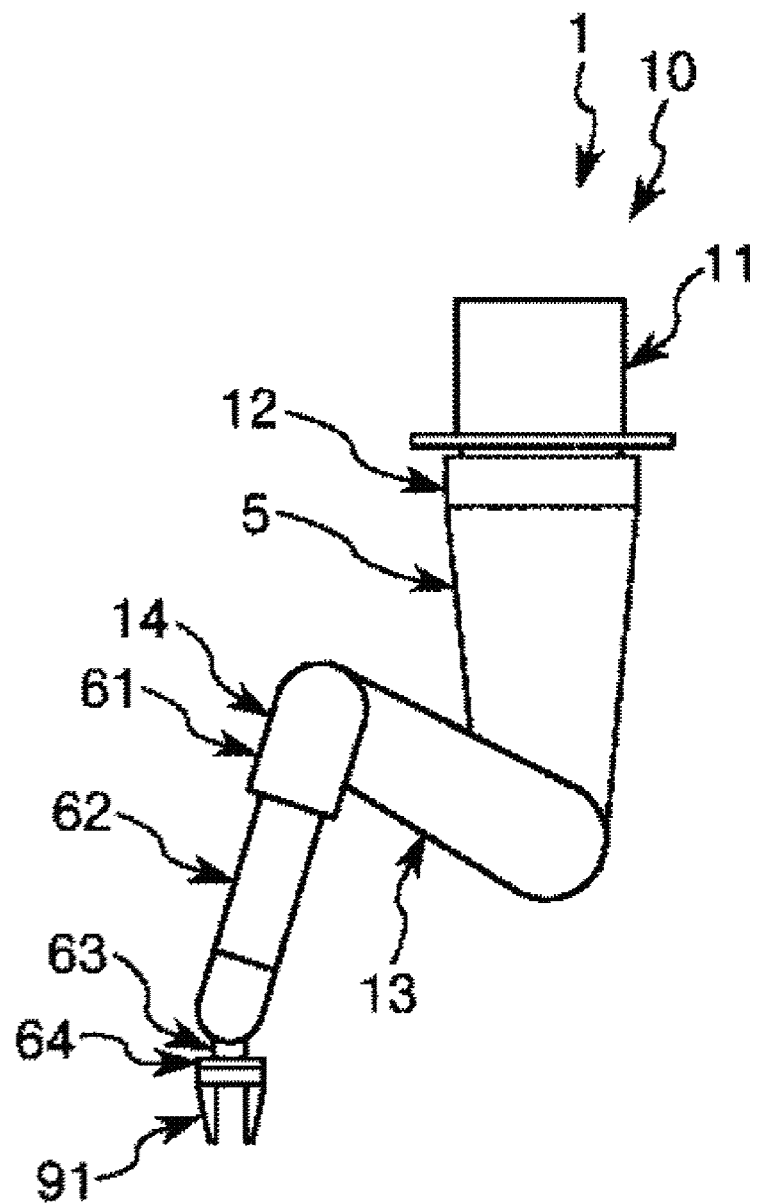
FIG. 7A is a diagram for illustrating a motion at the time of an operation of the robot shown in FIG. 1.
Figure 7B:
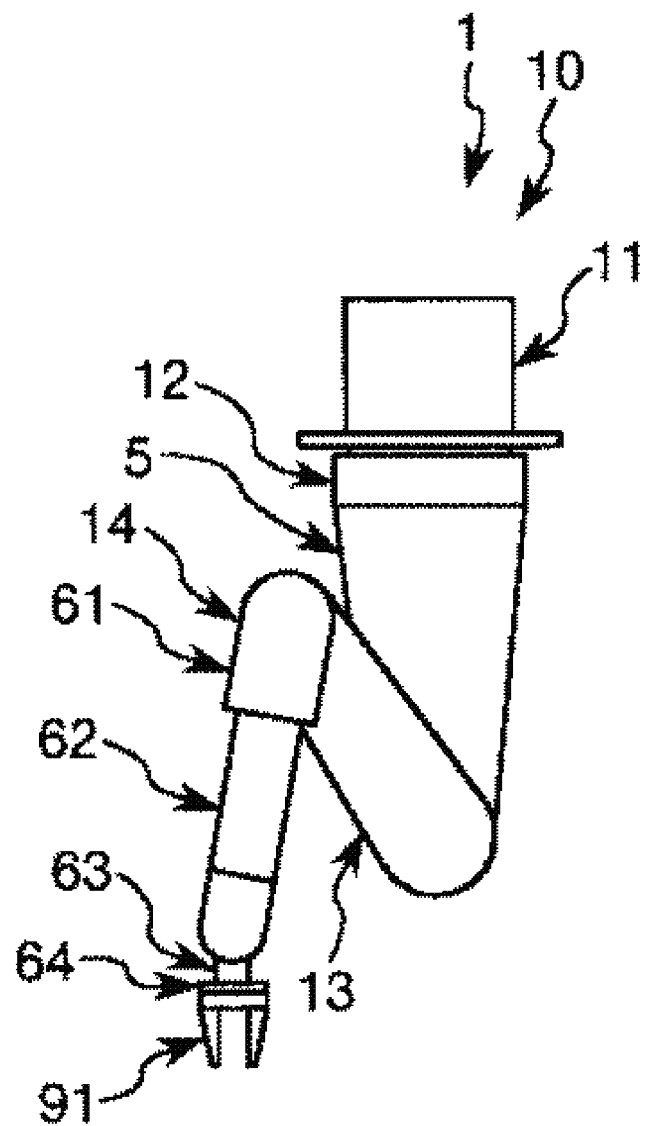
FIG. 7B is a diagram for illustrating a motion at the time of an operation of the robot shown in FIG. 1.
Figure 7C:
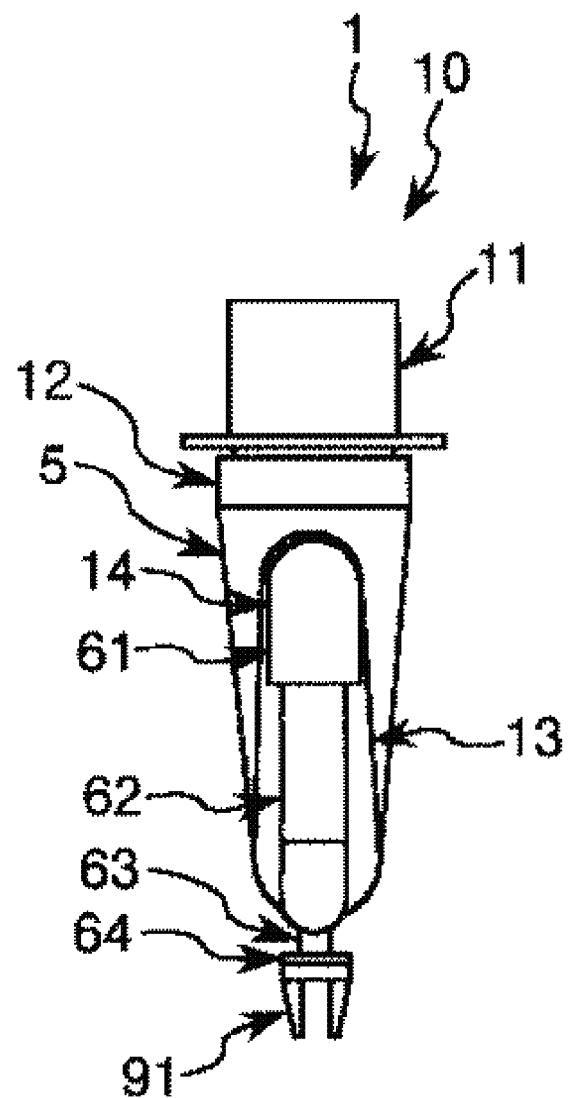
FIG. 7C is a diagram for illustrating a motion at the time of an operation of the robot shown in FIG. 1.
Figure 7D:
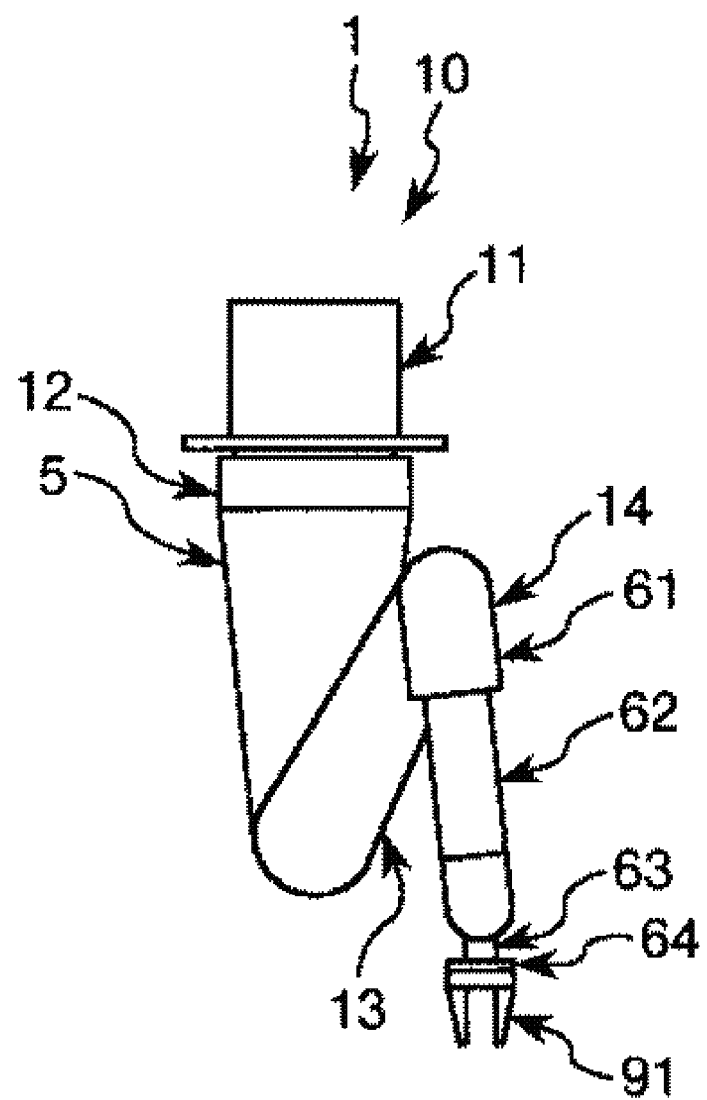
FIG. 7D is a diagram for illustrating a motion at the time of an operation of the robot shown in FIG. 1.
Figure 7E:
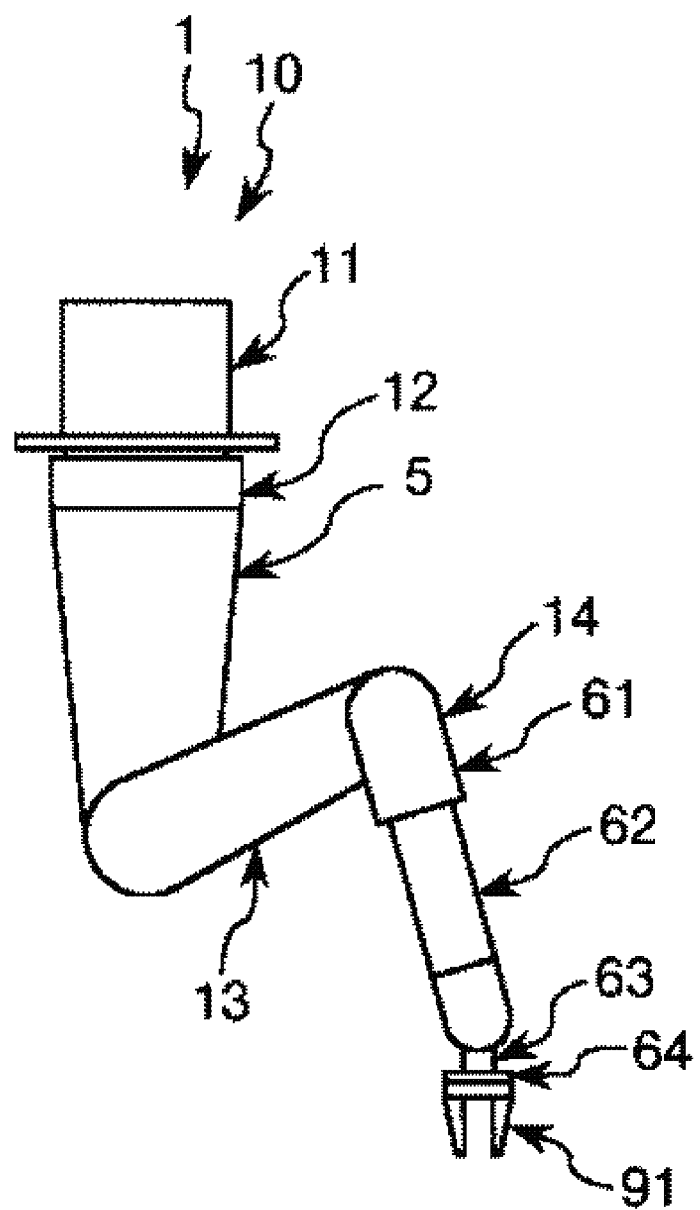
FIG. 7E is a diagram for illustrating a motion at the time of an operation of the robot shown in FIG. 1.

Next, as shown in FIGS. 7A to 7E, by not rotating the first arm 12 (not performing an operation shown with arrows 57 and 58 of FIG. 6) but rotating the second arm 13 and the third arm 14 (performing an operation shown with an arrow 56 of FIG. 6), the hand 91 can be moved to a position rotated by 180° around the first rotation axis O1, that is, an insertion portion 73, through a state where the angle q formed by the first arm 12 and the second arm 13 is set as 0° (a state where the first arm 12 and the second arm 13 overlap each other) when seen in the axial direction of the second rotation axis O2 (see FIG. 7C). At that time, the distal end of the second arm 13 and the hand 91 (distal end of the third arm 14) move on the straight line. At that time, the first arm 12 may also rotate as an operation of fine adjustment.

As shown in FIG. 5, the component 41 is inserted into the component 42 in the insertion portion 73. At that time, the first arm 12 may also rotate as an operation of fine adjustment. Hereinafter, this operation is repeated.

In the robot 1, by not rotating the first arm 12 but rotating the second arm 13, the hand 91 can be moved to a position rotated by 180° around the first rotation axis O1, through a state where the angle q formed by the first arm 12 and the second arm 13 is set as 0° when seen in the axial direction of the second rotation axis O2, and accordingly, as shown in FIG. 6, a width W of the installation space of the robot 1 can be set to be W2 which is smaller than W1 of the related art. W2 is, for example, at least 80% smaller than W1. In the same manner as described above, a height (height in the vertical direction) of the installation space of the robot 1 can be set to be smaller than a height of the related art, and specifically, the height thereof can be at least 80% smaller than the height of the related art.

As described above, in the robot 1, by not rotating the first arm 12 but rotating the second arm 13 and the third arm 14, the hand 91 (distal end of the third arm 14) can be moved to a position rotated by 180° around the first rotation axis O1, through a state where the angle q formed by the first arm 12 and the second arm 13 is set as 0° (a state where the first arm 12 and the second arm 13 are overlapped each other) when seen in the axial direction of the second rotation axis O2.

Accordingly, it is possible to reduce the space provided for avoiding interference with the robot 1.

That is, first, it is possible to lower the ceiling 101, and accordingly, the position of the center of gravity of the robot 1 is lowered and it is possible to prevent vibration which occurs due to a reaction force generated by the motion of the robot 1.

In addition, it is possible to reduce the working area of the robot 1 in a width direction (direction of the production line) and accordingly, it is possible to dispose a large number of robots 1 along a production line by unit length, and to shorten the production line.

When the hand 91 is moved, the motion of the robot 1 can be minimized. For example, it is possible to not rotate the first arm 12 or to decrease a rotation angle of the first arm 12, and accordingly, it is possible to shorten the cycle time and to improve operation efficiency.

Second Embodiment

Figure 8:
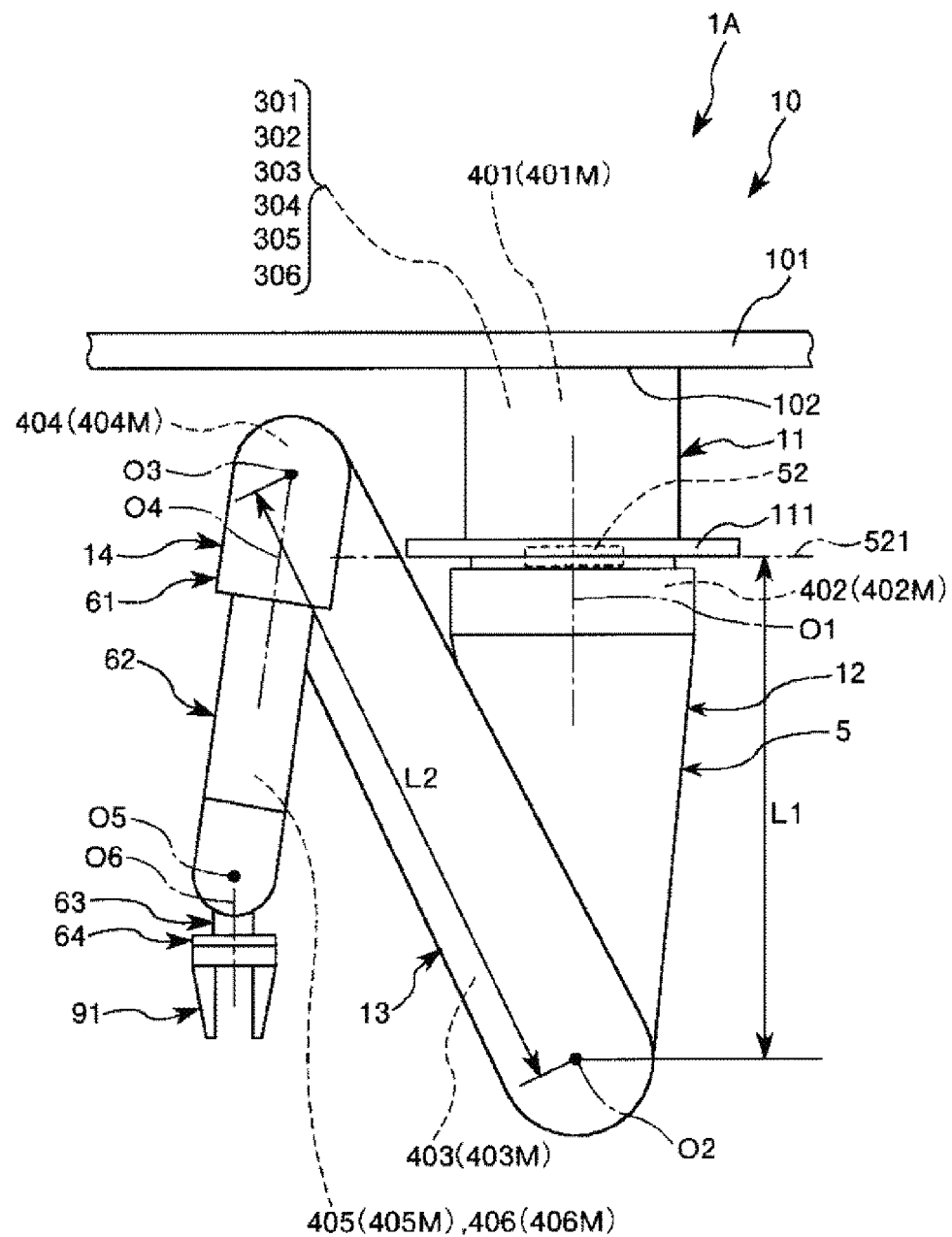
FIG. 8 is a front view showing a second embodiment of a robot according to the invention.

FIG. 8 is a front view showing a second embodiment of a robot according to the invention.

Hereinafter, the second embodiment will be described, but the description is focused on different points from those of the first embodiment described above and the description of the same matters will be omitted.

As shown in FIG. 8, in a robot 1A of the second embodiment, the length L2 of the second arm 13 is set to be greater than the length L1 of the first arm 12. Accordingly, in the robot 1A, the hand 91 can be moved further and the range of the vertical motion of the hand 91 can be increased.

The same effects as those in the first embodiment described above can be exhibited even in the second embodiment.

Third Embodiment

Figure 9:
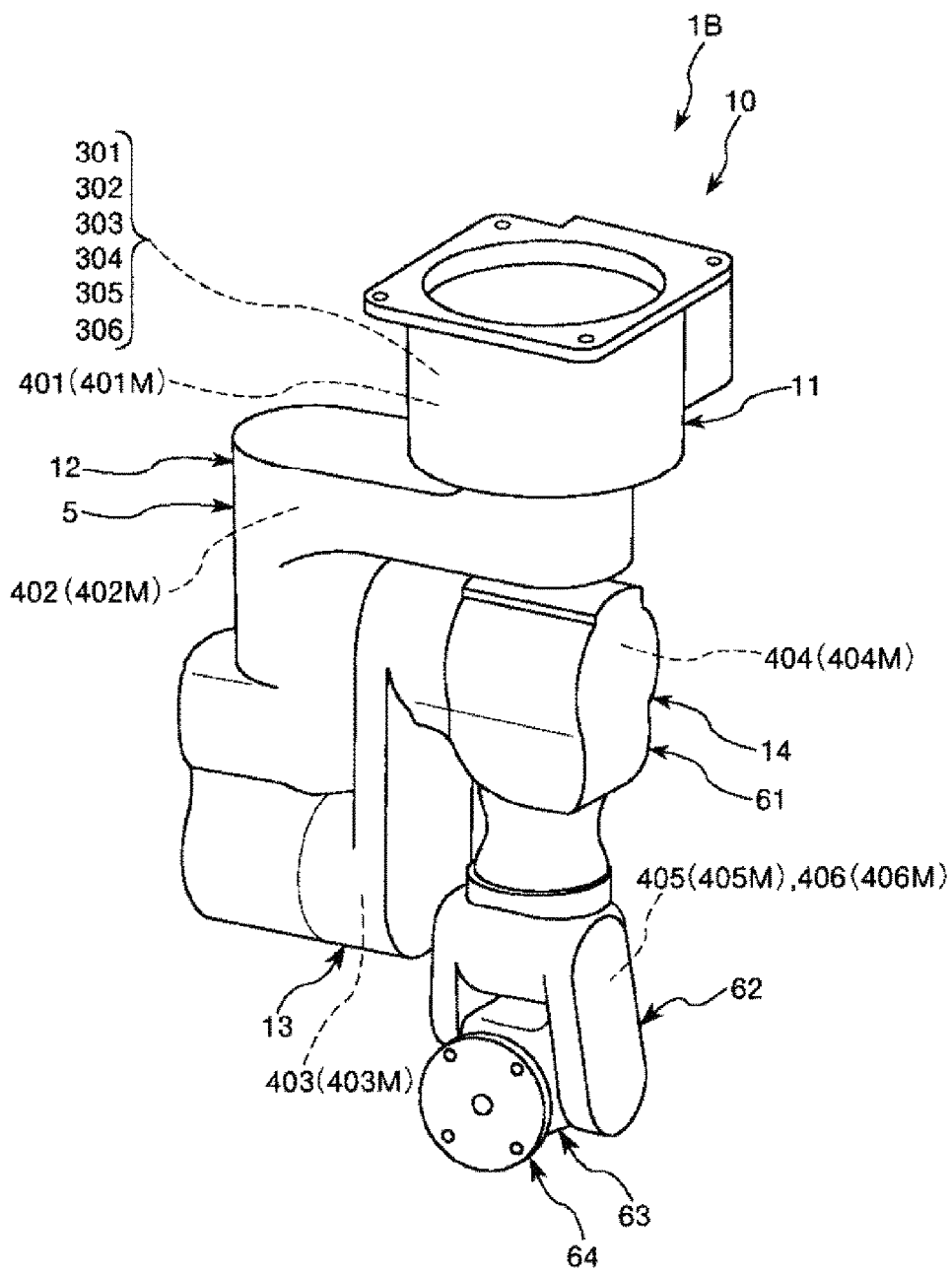
FIG. 9 is a perspective view showing a third embodiment of a robot according to the invention.
Figure 10:
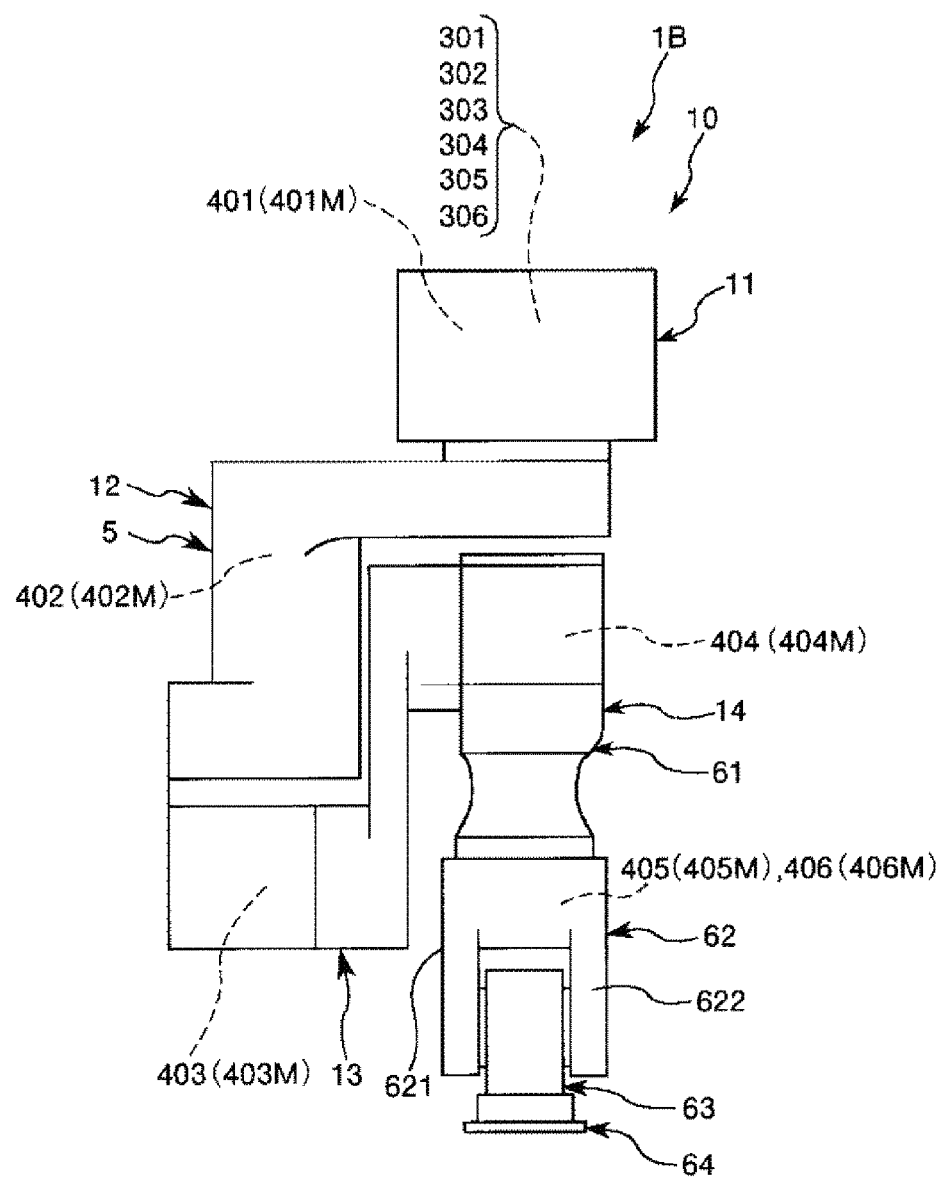
FIG. 10 is a side view of the robot shown in FIG. 9.

FIG. 9 is a perspective view showing a third embodiment of a robot according to the invention. FIG. 10 is a side view of the robot shown in FIG. 9. The hand 91 is omitted in FIGS. 9 and 10.

Hereinafter, the third embodiment will be described, but the description is focused on different points from those of the first embodiment described above and the description of the same matters will be omitted.

As shown in FIGS. 9 and 10, in a robot 1B of the third embodiment, the first arm 12 and the second arm 13 are respectively bent and apart thereof is protruded in a horizontal direction (left side of FIG. 10) with respect to the base 11.

The second link 62 of the third arm 14 includes a pair of supports 621 and 622 opposing each other and the third link 63 is connected between the supports 621 and 622.

The same effects as those in the first embodiment described above can be exhibited even in the third embodiment.

Fourth Embodiment

Figure 11:
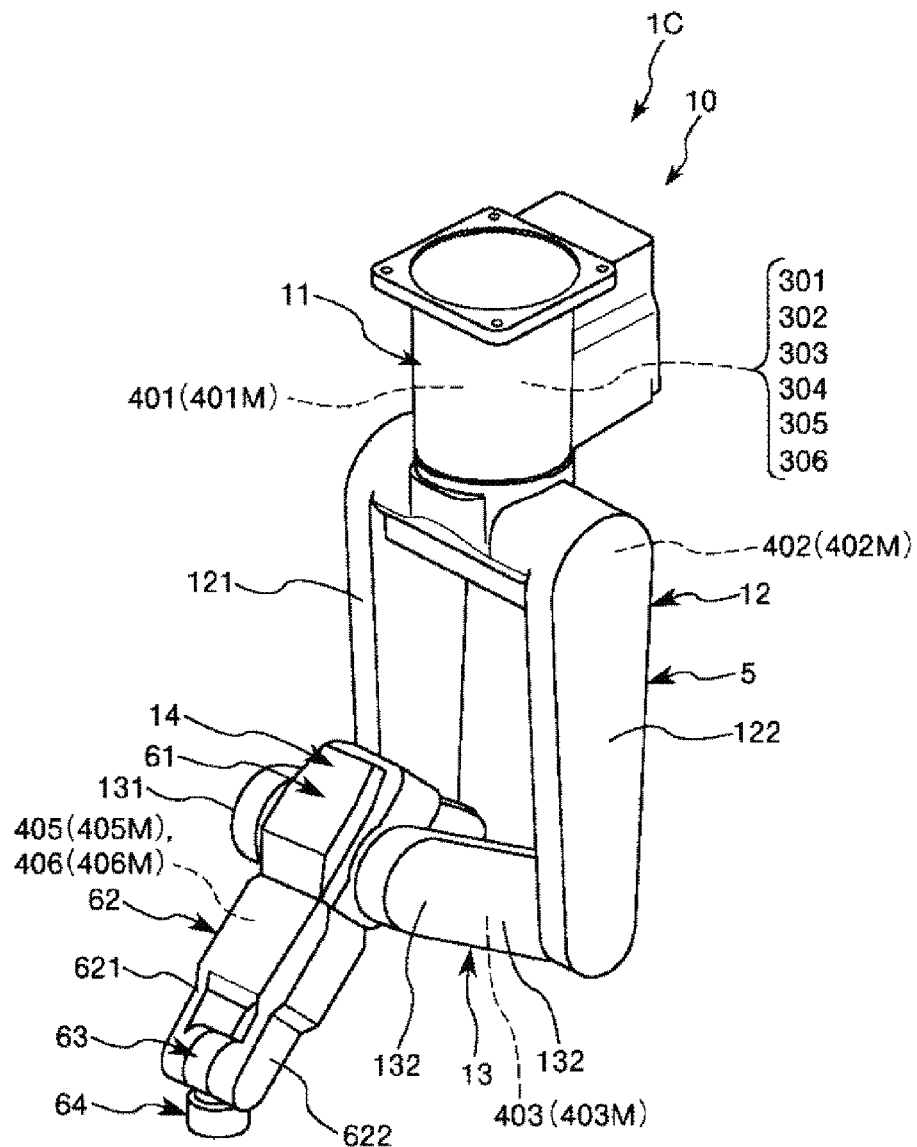
FIG. 11 is a perspective view showing a fourth embodiment of a robot according to the invention.

FIG. 11 is a perspective view showing a fourth embodiment of a robot according to the invention. The hand 91 is omitted in FIG. 11.

Hereinafter, the fourth embodiment will be described, but the description is focused on different points from those of the first embodiment described above and the description of the same matters will be omitted.

As shown in FIG. 11, in a robot 1C of the fourth embodiment, the first arm 12 includes a pair of supports 121 and 122 opposing each other and the second arm 13 is connected between the supports 121 and 122. The supports 121 and 122 are protruded in a horizontal direction (horizontal direction of FIG. 11) with respect to the base 11.

In the same manner as described above, the second arm 13 includes a pair of supports 131 and 132 opposing each other and the third arm 14 is connected between the supports 131 and 132.

The second link 62 of the third arm 14 includes a pair of supports 621 and 622 opposing each other and the third link 63 is connected between the supports 621 and 622.

The same effects as those in the first embodiment described above can be exhibited even in the fourth embodiment.

Fifth Embodiment

Figure 12A:
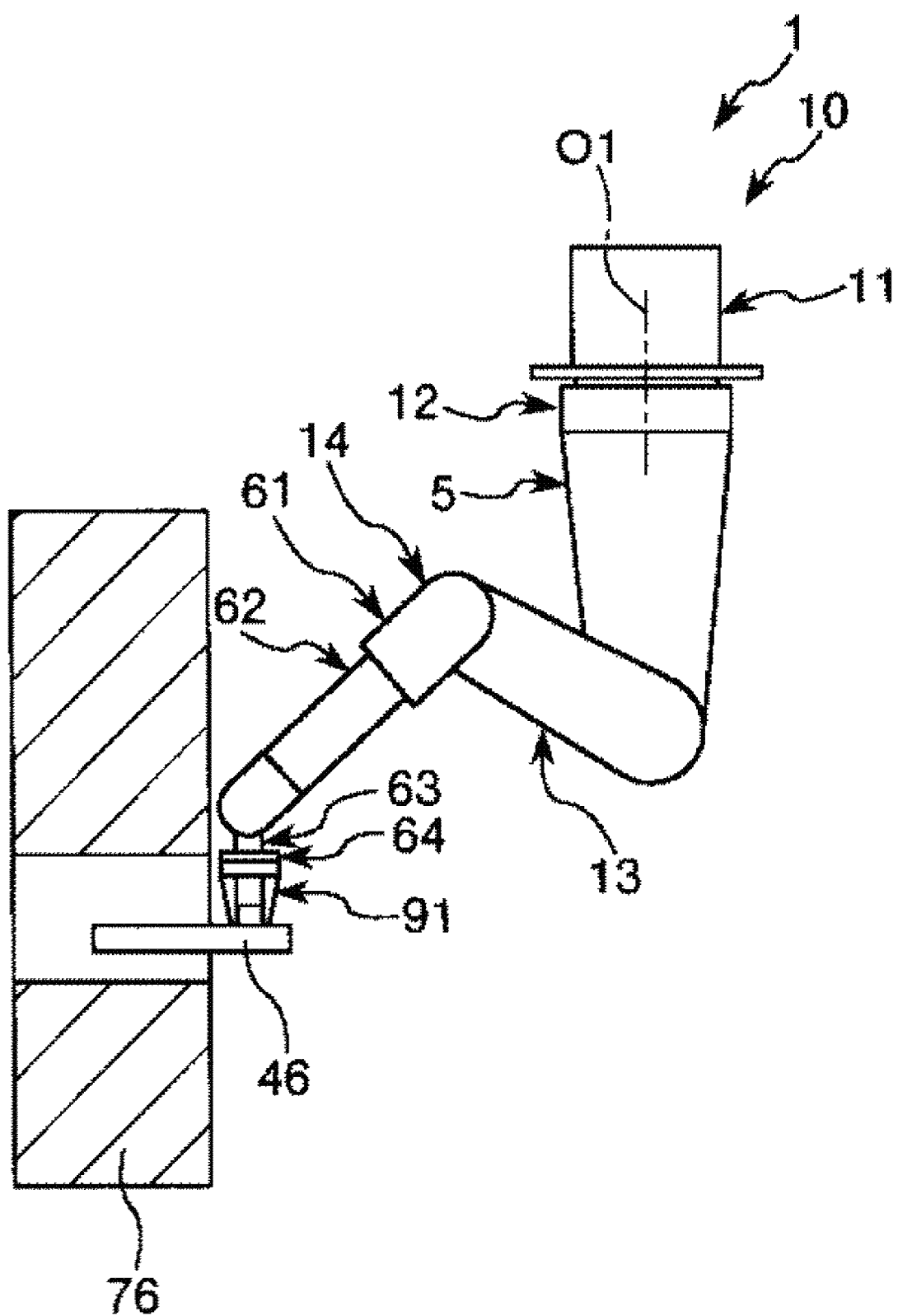
FIG. 12A is a diagram for illustrating a motion of a robot according to the invention in a fifth embodiment.
Figure 12B:
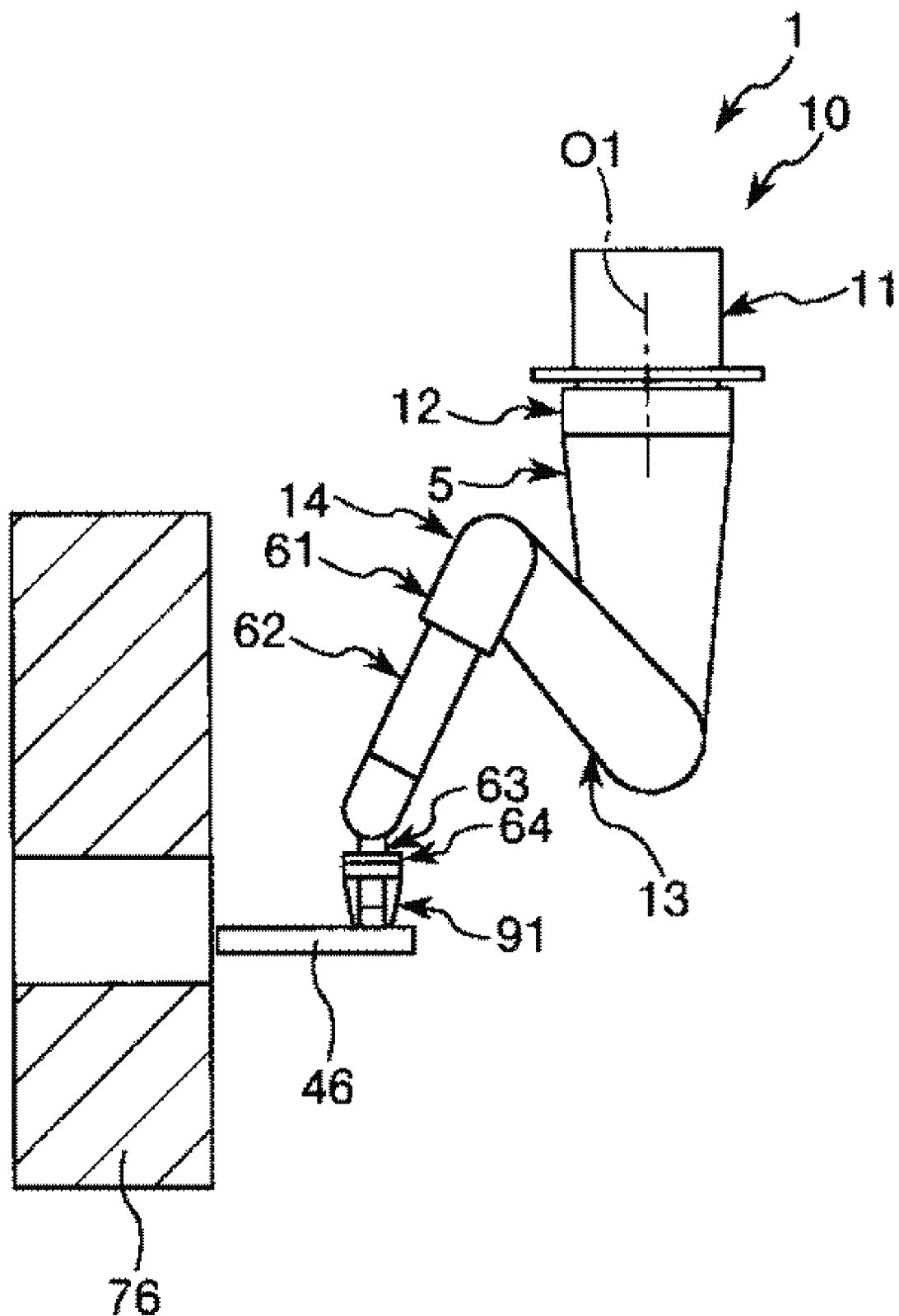
FIG. 12B is a diagram for illustrating a motion of a robot according to the invention in a fifth embodiment.
Figure 12C:
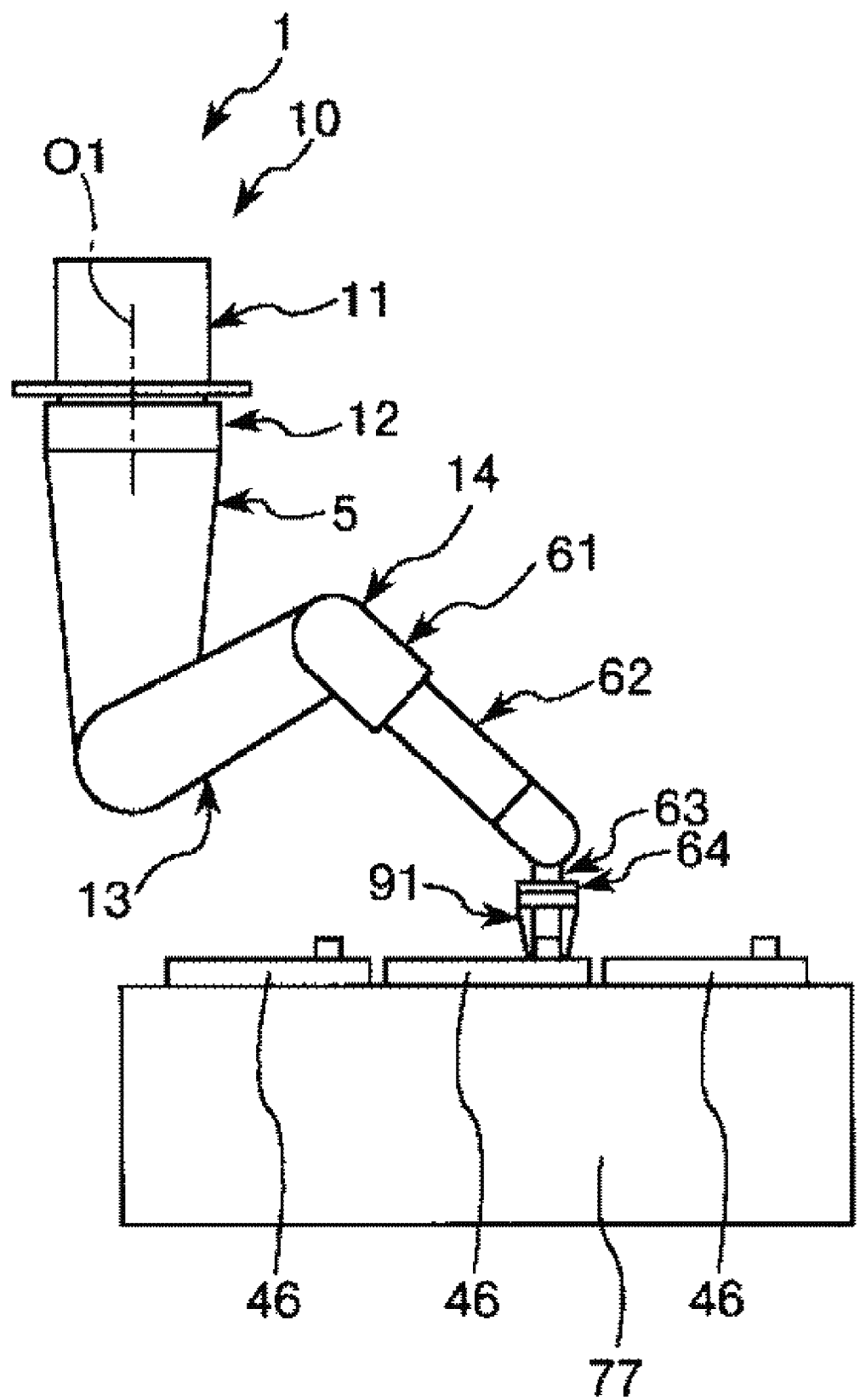
FIG. 12C is a diagram for illustrating a motion of a robot according to the invention in a fifth embodiment.

FIGS. 12A to 12C are diagrams for illustrating a motion of a robot according to the invention in a fifth embodiment.

Hereinafter, the fifth embodiment will be described, but the description is focused on different points from those of the first embodiment described above and the description of the same matters will be omitted. In the fifth embodiment, the description will be made using the robot 1 of the first embodiment, and this configuration can be applied to the robots 1A to 1C of the second to fourth embodiments and a robot 1D of a seventh embodiment which will be described later, in the same manner.

In the fifth embodiment, in the robot 1, the distal end of the robot arm 5 can be moved from the first position to a third position having the equivalent height (position in the vertical direction) as that of the first position and to move the end portion thereof from the third position to the second position, and the reverse operation, that is, an operation of moving the distal end of the robot arm 5 from the second position to the third position and from the third position to the first position can also be performed. As shown in FIGS. 12A to 12C, by using this function, the robot 1 performs an operation of extracting a work 46 disposed on a shelf 76, transporting the work to a stage 77, and disposing the work on the stage 77.

The stage 77 is disposed on a position which is moved from the shelf 76 by 180° around the first rotation axis O1 of the robot 1.

The shape of the work 46 is not particularly limited, but in the embodiment, a plate shape is used.

A portion of the shelf 76 which is positioned on the upper portion and the lower portion of the work 46 is an obstacle when the robot 1 extracts the work 46 from the shelf 76. In the embodiment, the shelf has been described as an example of the obstacle at the time of the motion of the robot 1, but the obstacle is not limited to the shelf and various components which are positioned on the upper portion and the lower portion of the work 46 such as an apparatus can be assumed, for example.

In this operation, first, as shown in FIG. 12A, the robot 1 grasps and lifts up the work 46 disposed on the shelf 76 with the hand 91. The position of the distal end of the robot arm 5 shown in FIG. 12A is the first position.

Next, as shown in FIG. 12B, the robot 1 moves the work 46 in the horizontal direction while maintaining the height (position in the vertical direction) of the work 46 (distal end of the robot arm 5) constant, and extracts the work 46 from the shelf 76. At that time, the robot 1 does not rotate the first arm 12 and rotates the second arm 13 and the first link 61 and the third link 63 of the third arm 14. Accordingly, the distal end of the second arm 13 and the distal end of the robot arm 5 move on the straight line, when seen in the axial direction of the first rotation axis O1. If necessary, the fine adjustment may be performed by rotating an arbitrary component among the first arm 12, and the second link 62 and the fourth link 64 of the third arm 14. The position of the distal end of the robot arm 5 shown in FIG. 12B is the third position. The heights (positions in the vertical direction) of the first position and the third position are equivalent to each other.

Next, as shown in FIG. 12C, the robot 1 transports the work 46 to the stage 77 and disposes the work on the stage 77. At that time, the robot 1 does not rotate the first arm 12 and rotates the second arm 13 and the first link 61 and the third link 63 of the third arm 14. Accordingly, the distal end of the second arm 13 and the distal end of the robot arm 5 move on the straight line, when seen in the axial direction of the first rotation axis O1. If necessary, the fine adjustment may be performed by rotating an arbitrary component among the first arm 12, and the second link 62 and the fourth link 64 of the third arm 14. The position of the distal end of the robot arm 5 shown in FIG. 12C is the second position. The heights of the second position, and the first position and the third position may be equivalent to each other or may be different from each other.

The robot 1 can perform the reverse operation, that is, an operation of transporting the work 46 disposed on the stage 77 to the shelf 76 and disposing the work on the shelf 76. Hereinafter, this operation will be described.

In this operation, first, as shown in FIG. 12C, the robot 1 grasps the work 46 disposed on the stage 77 with the hand 91.

Next, as shown in FIG. 12B, the robot 1 transports the work 46 to the vicinity of the shelf 76. At that time, the robot 1 does not rotate the first arm 12 and rotates the second arm 13 and the first link 61 and the third link 63 of the third arm 14. Accordingly, the distal end of the second arm 13 and the distal end of the robot arm 5 move on the straight line, when seen in the axial direction of the first rotation axis O1. If necessary, the fine adjustment may be performed by rotating an arbitrary component among the first arm 12, and the second link 62 and the fourth link 64 of the third arm 14.

Next, as shown in FIG. 12A, the robot 1 moves the work 46 in the horizontal direction while maintaining the height (position in the vertical direction) of the work 46 (distal end of the robot arm 5) constant, and moves the work 46 in the shelf 76. At that time, the robot 1 does not rotate the first arm 12 and rotates the second arm 13 and the first link 61 and the third link 63 of the third arm 14. Accordingly, the distal end of the second arm 13 and the distal end of the robot arm 5 move on the straight line, when seen in the axial direction of the first rotation axis O1. If necessary, the fine adjustment may be performed by rotating an arbitrary component among the first arm 12, and the second link 62 and the fourth link 64 of the third arm 14. Next, the robot 1 lifts down and releases the work 46 and disposes the work on the shelf 76.

As described above, in the robot 1, it is possible to extract the work 46 from the shelf 76 or dispose the work 46 on the shelf 76 while preventing interference with the shelf 76.

The distal end of the robot arm 5 can be moved to a wide range between the position of the first rotation axis O1 and a position which is far apart from the first rotation axis O1, without rotating the first rotation axis O1, and accordingly, as shown in FIG. 12C, it is possible to transport the work 46 in a wide range from the portion close to the first rotation axis O1 to a distant portion.

Since it is possible to move the distal end of the robot arm 5 from one of the first position and the second position to the other position, without rotating the first arm 12, it is possible to decrease the area of the installation space of the robot 1. For example, when the work 46 has a long shape (large size) such as a substrate or a panel, it is possible to prevent an effect on the size of the installation space of the robot 1 due to the size of the work 46.

Sixth Embodiment

Figure 13A:
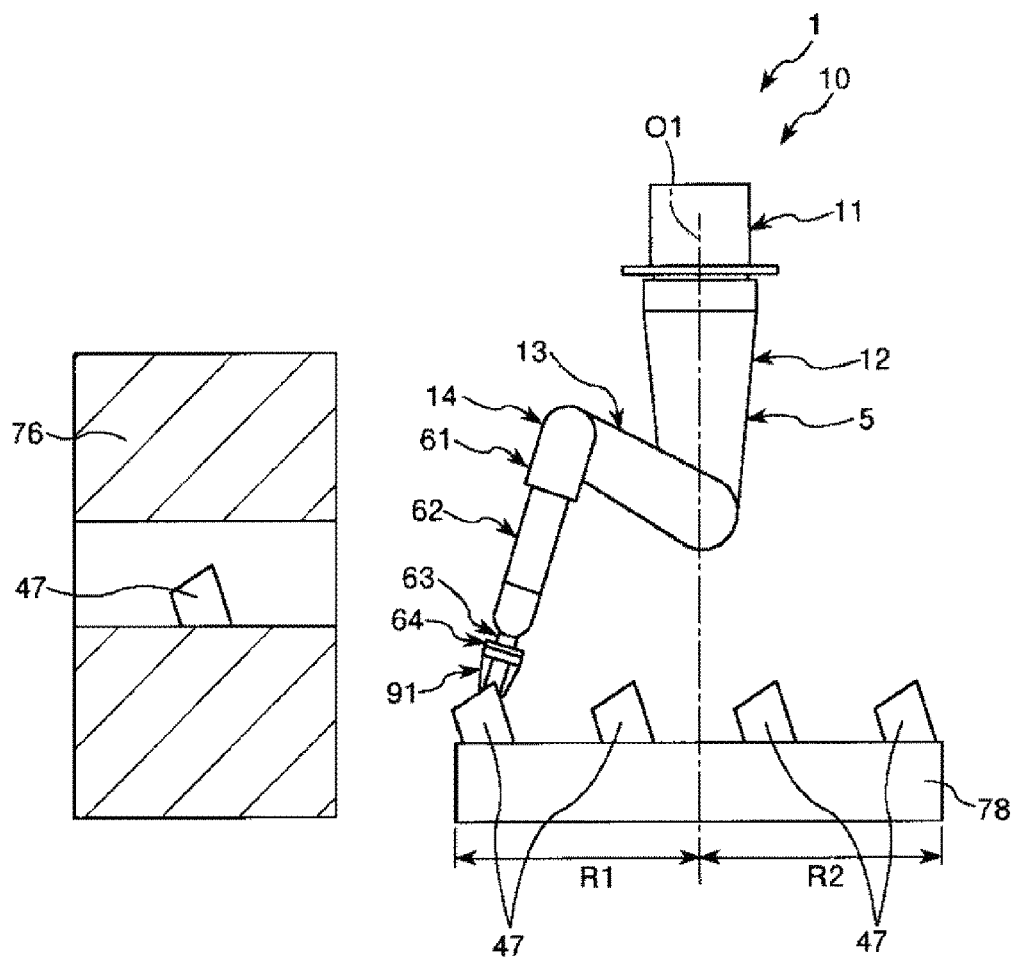
FIG. 13A is a diagram for illustrating a motion of a robot according to the invention in a sixth embodiment.
Figure 13B:
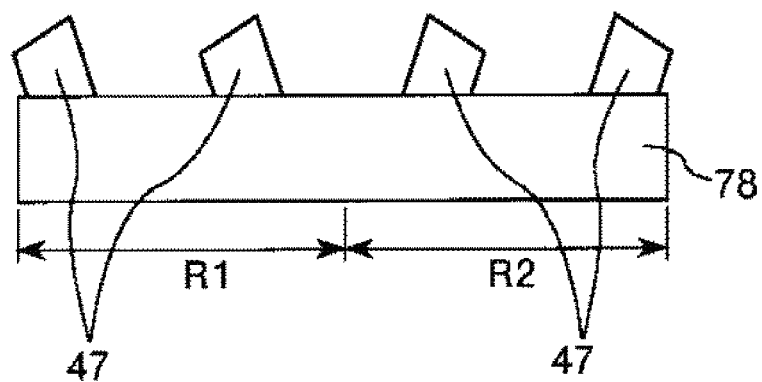
FIG. 13B is a diagram for illustrating a motion of a robot according to the invention in a sixth embodiment.

FIGS. 13A and 13B are diagrams for illustrating a motion of a robot according to the invention in a sixth embodiment.

Hereinafter, the sixth embodiment will be described, but the description is focused on different points from those of the first embodiment described above and the description of the same matters will be omitted. In the sixth embodiment, the description will be made using the robot 1 of the first embodiment, and this configuration can be applied to the robots 1A to 1C of the second to fourth embodiments and a robot 1D of a seventh embodiment which will be described later, in the same manner.

As shown in FIG. 13A, in the sixth embodiment, the robot 1 performs an operation of transporting a work 47 disposed on a palette 78 to the shelf 76 and disposing the work on the shelf 76.

The palette 78 is disposed on a position which is moved from the shelf 76 by 180° around the first rotation axis O1 of the robot 1.

In this operation, first, as shown in FIG. 13A, the robot 1 grasps the work 47 disposed on the palette 78 with the hand 91.

Next, in the same manner as in the fifth embodiment, the robot 1 transports the work 47 to a portion close to the shelf 76, moves the work in the shelf 76, lifts down, releases, and disposes the work 47 on the shelf 76 without rotating the first arm 12.

Herein, in the robot of the related art, when transporting the work 47 which is disposed in a region R1 of the palette 78 on the shelf 76 side with respect to the first rotation axis O1, the first arm is not rotated, however, when transporting the work 47 which is disposed in a region R2 on the opposite side to the shelf 76, the first arm is rotated by 180°. Accordingly, in the robot of the related art, as shown in FIG. 13B, it is necessary to change a direction of the work 47 by 180° in the region R1 and the region R2 of the palette 78. Alternatively, in the robot of the related art, when the directions of the work 47 coincide in the region R1 and the region R2 of the palette 78, it is necessary to rotate the arm (link) on the distal end side by 180° to return the direction of the work 47 to the original direction, when transporting the work 47 which is disposed in the region R2 of the palette 78.

With respect to this, in the robot 1, even when transporting the work 47 disposed in any one of the regions R1 and R2 of the palette 78, the first arm 12 is not rotated, and accordingly, it is not necessary to perform complicated operation or control such as in the case of the robot of the related art, and it is possible to simplify the operation and control.

Seventh Embodiment

Figure 14:
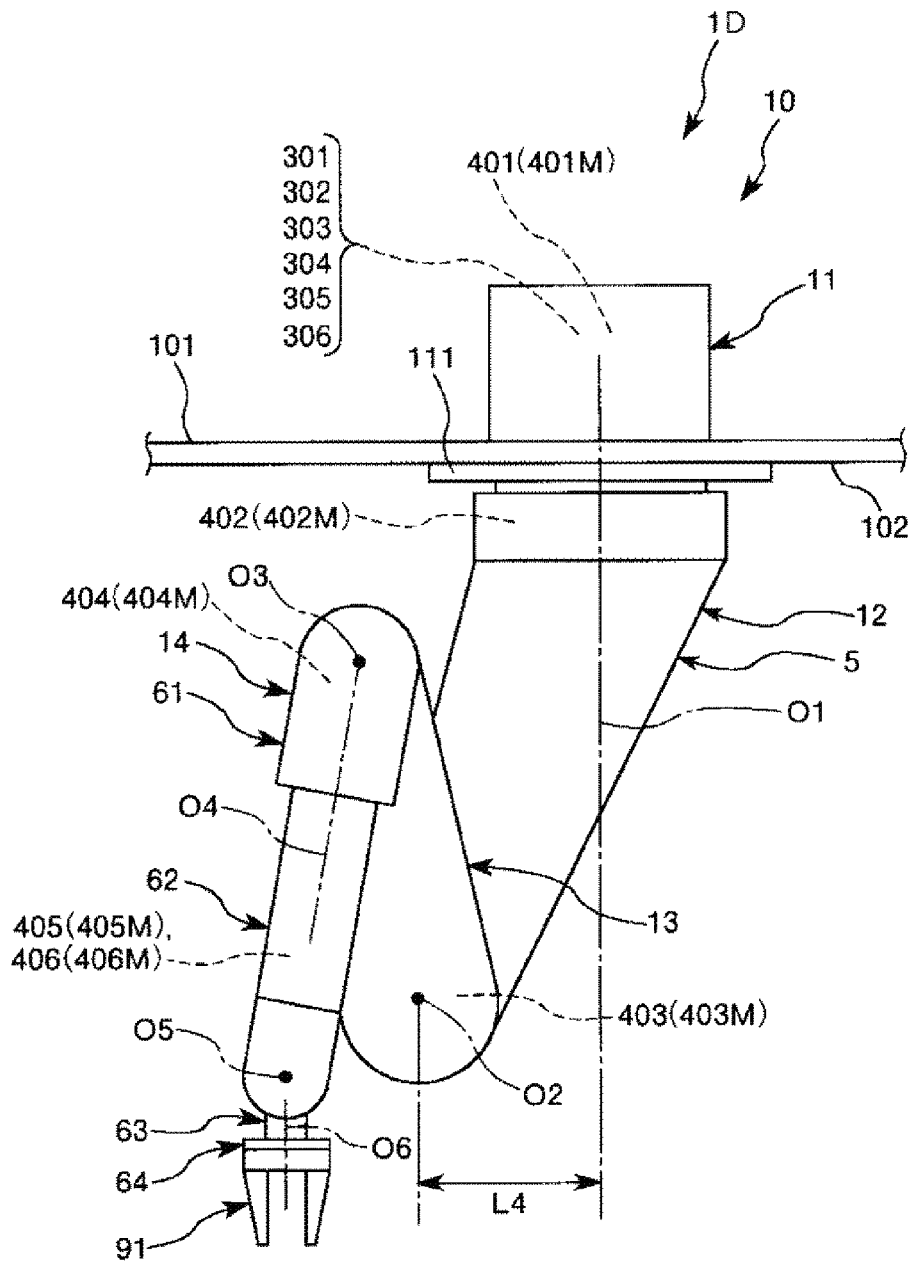
FIG. 14 is a front view showing a seventh embodiment of a robot according to the invention.

FIG. 14 is a front view showing a seventh embodiment of a robot according to the invention.

Hereinafter, the seventh embodiment will be described, but the description is focused on different points from those of the first embodiment described above and the description of the same matters will be omitted.

As shown in FIG. 14, in a robot 1D of the seventh embodiment, the first arm 12 is inclined with respect to the first rotation axis O1 (vertical direction). Accordingly, the second rotation axis O2 is separate from the first rotation axis O1 by a distance L4.

In the robot 1D, the distal end of the second arm 13 can be moved to a position further separated from the first rotation axis O1 by the distance L4, compared to a case where the second rotation axis O2 and the first rotation axis O1 are not separate from each other, that is, the distal end of the robot arm 5 can be moved to a position further separated from the first rotation axis O1 by the distance L4.

The same effects as those in the first embodiment described above can be exhibited even in the seventh embodiment.

Eighth Embodiment

Figure 15:
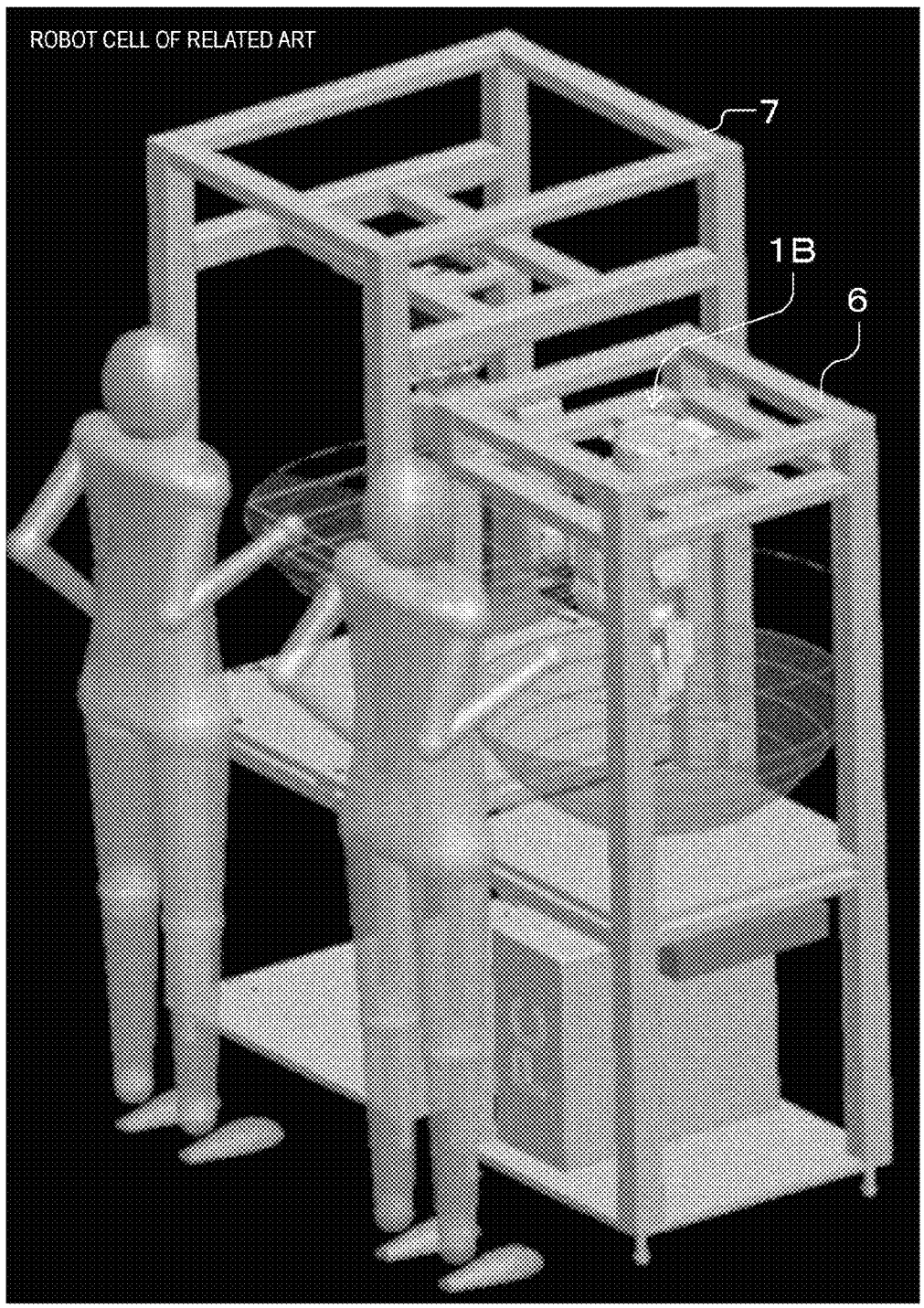
FIG. 15 is a perspective view showing an eighth embodiment of a robot system according to the invention.
Figure 16:
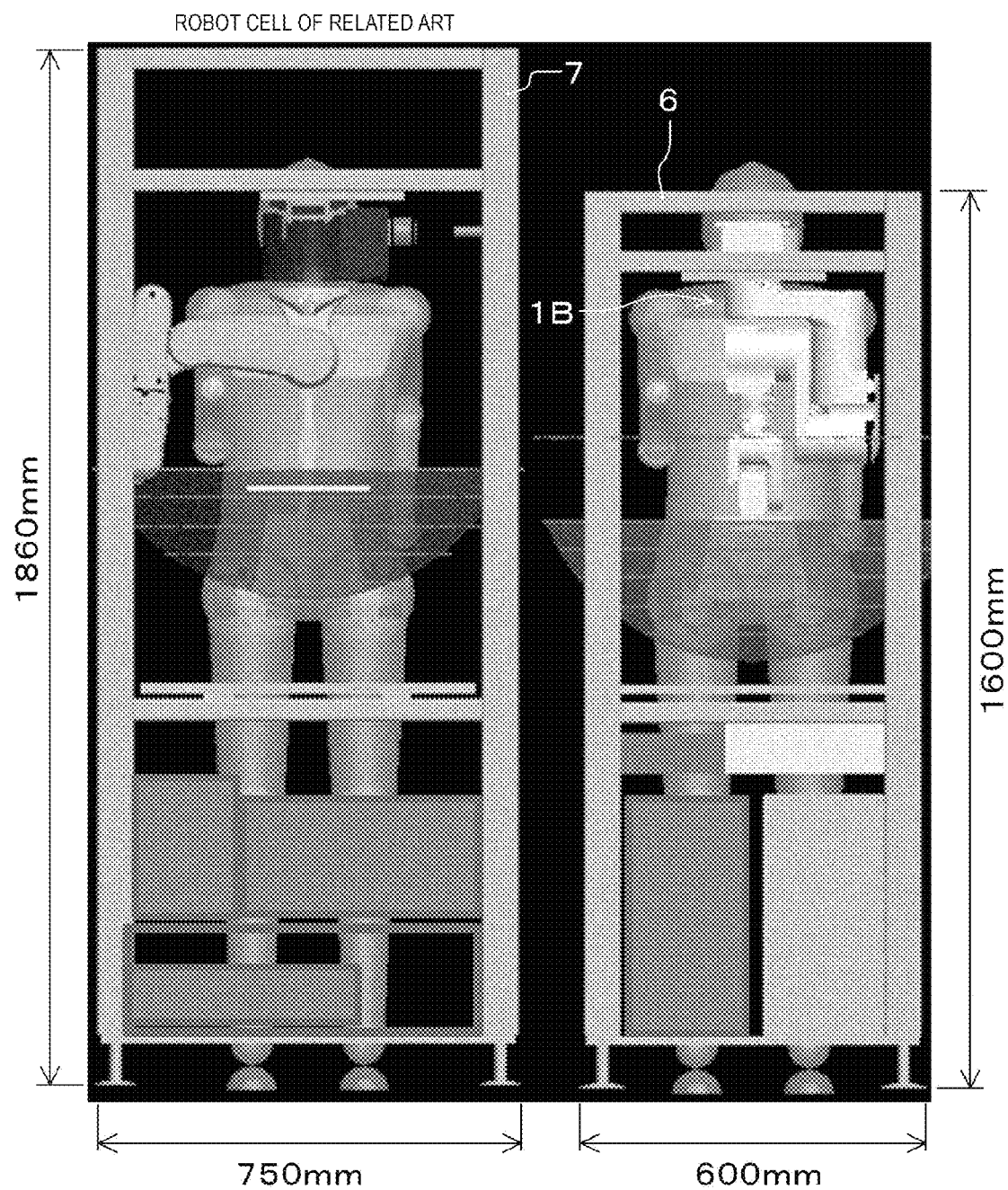
FIG. 16 is a front view showing the eighth embodiment of the robot system according to the invention.
Figure 17:
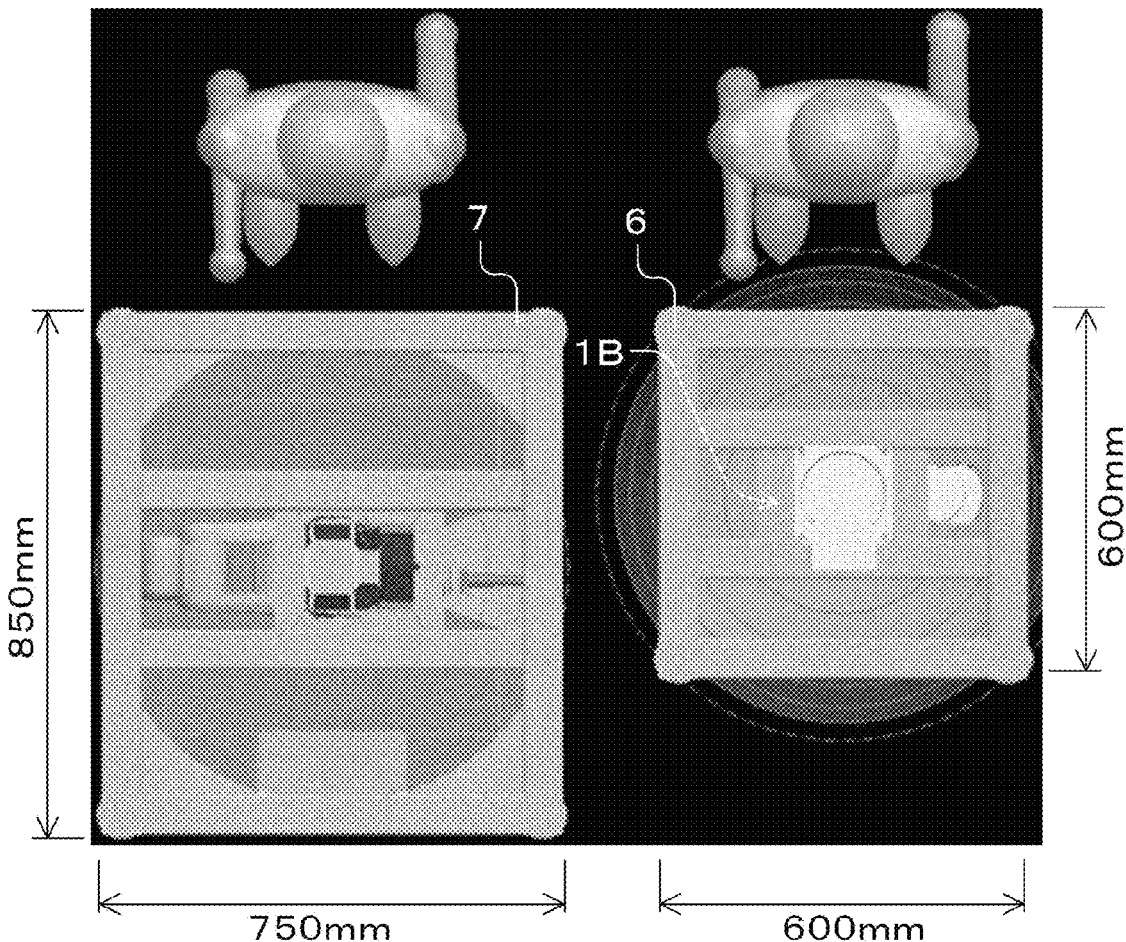
FIG. 17 is a top view showing the eighth embodiment of the robot system according to the invention.
Figure 18:
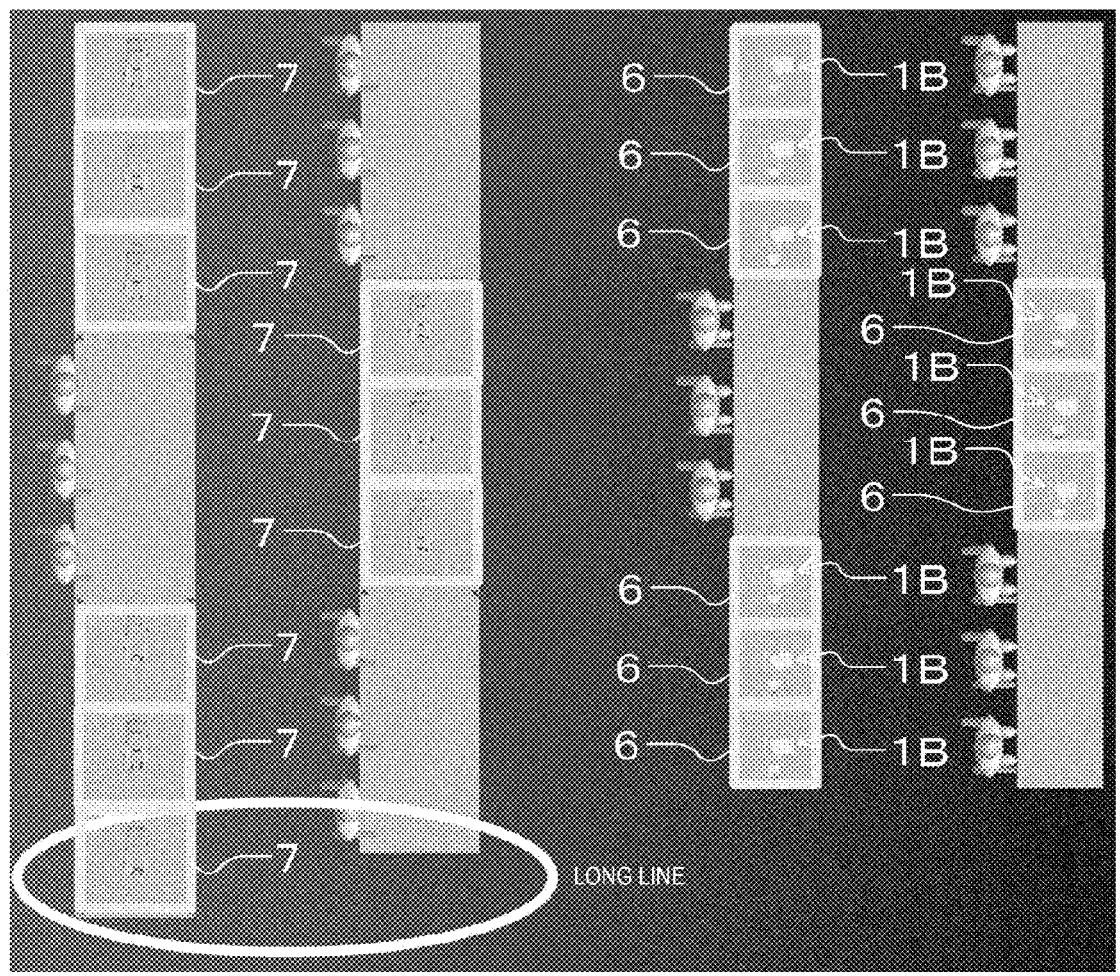
FIG. 18 is a plan view showing the eighth embodiment of the robot system according to the invention.
Figure 19:
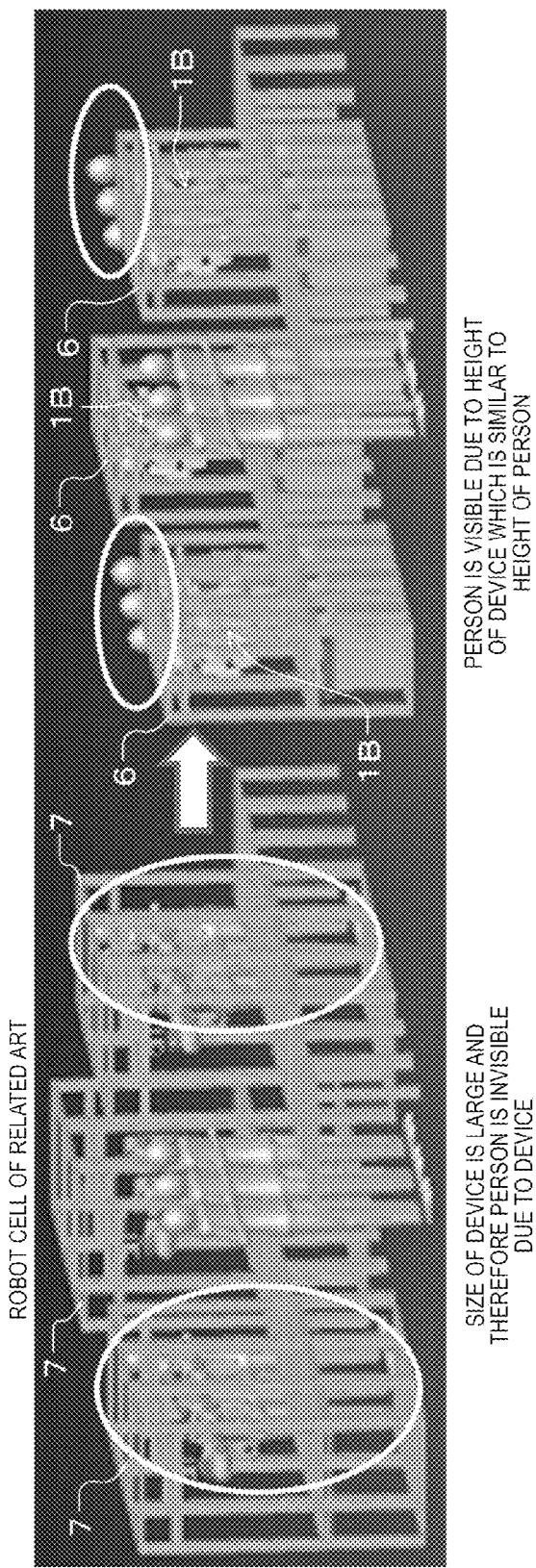
FIG. 19 is a perspective view showing the eighth embodiment of the robot system according to the invention.

FIG. 15 is a perspective view showing an eighth embodiment of a robot system according to the invention. FIG. 16 is a front view showing the eighth embodiment of the robot system according to the invention. FIG. 17 is a top view showing the eighth embodiment of the robot system according to the invention. FIG. 18 is a plan view showing the eighth embodiment of the robot system according to the invention. FIG. 19 is a perspective view showing the eighth embodiment of the robot system according to the invention.

In FIGS. 15 to 19, a robot cell 7 of the related art is shown as a reference so as to compare the size thereof with the size of a robot cell 6 of the embodiment. Operators with a height of 165 cm and a shoulder width of 60 cm are shown as a reference in the same manner. The robot system includes the robot and the robot cell where the robot is provided.

Hereinafter, the eighth embodiment will be described. In the eighth embodiment, the description will be made using the robot 1B of the third embodiment, but it is not limited to the robot 1B, and the embodiment can be applied in the same manner, as long as it is a robot having a smaller size than that of the robot cell 6.

FIG. 15 shows a case where the robot cell 7 is disposed beside the robot cell 6. As shown in FIGS. 16 and 17, the robot cell 7 has a height of 1,860 mm, a width of 750 mm, and a depth of 850 mm. Accordingly, the installation area of the robot cell is 637,500 mm$^2$ and the volume of the robot cell 7 is 1,185,750,000 mm$^3$.

Meanwhile, the robot cell 6 has a height of 1,600 mm, a width of 600 mm, and a depth of 600 mm. Accordingly, the installation area of the robot cell 6 is 360,000 mm$^2$ and the volume of the robot cell 6 is 576,000,000 mm$^3$.

As shown in FIG. 18, when a part of cell for an operation of an operator is replaced with the robot cell 7, the robot cell 7 is greater than the cell for an operation of an operator, and accordingly, the production line becomes long. Meanwhile, when apart of cell for an operation of an operator is replaced with the robot cell 6, the size of the robot cell 6 is the same as the cell for an operation of an operator, and accordingly, it is possible to prevent a long production line.

Specifically, by setting the installation area of the robot cell to be less than 637,500 mm$^2$ which is the installation area of the robot cell 7, it is possible to increase the number of production lines and to prevent a long production line.

By setting the installation area thereof to be equal to or smaller than 500,000 mm$^2$, it is possible to further prevent a long production line.

By setting the installation area thereof to be equal to or smaller than 400,000 mm$^2$, the installation area thereof becomes the installation area having substantially the same or equal to or smaller than the cell for an operation of an operator, and accordingly, it is possible to easily replace the cell for an operation of an operator to the robot cell.

The height of the robot cell 6 is equal to or smaller than 1,700 mm. Accordingly, when the cell for an operation of an operator is replaced with the robot cell 6, the height thereof is smaller than the height of the robot cell 7, operators operating in other cells can be checked, as shown in FIG. 19.

The height of the robot cell 6 is preferably from 1,000 mm to 1,650 mm. Accordingly, it is possible to prevent an effect of vibration when the robot 1B is operated in the robot cell 6.

In the robot cell 6, a volume ratio of the robot 1B with respect to the volume of the robot cell 6 (volume of the robot 1B/volume of the robot cell 6) is preferably from 0.01 to 0.5. For example, when the volume of the robot 1B is 7,000,000 mm$^3$ and the volume of the robot cell 6 is 576,000,000 mm$^3$, the value of (volume of the robot 1B/volume of the robot cell 6) is equal to or greater than 0.01. Accordingly, by increasing the volume ratio which is equal to or greater than 0.01, because the volume ratio of the related art is equal to or smaller than 0.01, it is possible to realize space saving of the robot cell 6 and to make the operations efficient.

In addition, in the robot cell 6, the volume ratio of the robot 1B with respect to the volume of the robot cell 6 (volume of the robot 1B/volume of the robot cell 6) is from 0.01 to 0.1. Accordingly, it is possible to widen a movable range of the robot 1B, compared to a case where the volume ratio is equal to or smaller than 0.5.

In the robot cell 6, the weight of the robot 1B is preferably equal to or smaller than 20 kg. Accordingly, it is possible to prevent an effect of vibration when the robot 1B is operated in the robot cell 6.

In the robot cell 6, the robot 1B includes the base 11 which is provided on the robot cell 6, the first arm 12 which is provided on the base 11 so as to be rotatable around the first rotation axis O1, and the second arm 13 which is provided on the first arm 12 so as to be rotatable around the second rotation axis O2 having an axial direction different from the axial direction of the first rotation axis O1, and the length of the first arm 12 is preferably greater than the length of the second arm 13. Accordingly, it is possible to effectively perform the operation in a small space of the robot cell 6.

Hereinabove, the robot and the robot system according to the invention have been described based on the embodiments shown in the drawings, but the invention is not limited thereto, and configuration of each unit can be replaced with an arbitrary configuration having the same function. Other arbitrary components may be added.

In the invention, two or more arbitrary configurations (features) among the embodiments may be combined with each other.

In the embodiment, the number of rotation axes of the robot arm is six, but the invention is not limited thereto, and the number of rotation axes of the robot arm may be, for example, two, three, four, five, or seven or more. That is, in the embodiment, the number of links is six, but the invention is not limited thereto, and the number of links may be, for example, two, three, four, five, or seven or more.

Specifically, in the embodiment, the first arm is configured with one link, but the invention is not limited thereto, and the first arm may be configured with the plurality of links, for example.

In the embodiment, the second arm is configured with one link, but the invention is not limited thereto, and the second arm may be configured with the plurality of links, for example.

In the embodiment, the third arm is configured with four links, but the invention is not limited thereto, and the third arm may be configured with one, two, three, or five or more links, for example.

In the invention, the third arm may be omitted. In this case, an end effector is detachably attached to the distal end of the second arm, for example.

In the embodiment, the number of robot arms is 1, but the invention is not limited thereto, and the number of robot arms may be two or more, for example. That is, the robot (robot main body) may be a robot having a plurality of arms such as a double arm robot.

In the invention, the robot (robot main body) may be a robot having other systems. As a specific example, a leg type walking (travel) robot including legs is used, for example.

The invention claimed is:

1. A robot comprising:
   a base;
   a first arm which is provided on the base so as to be rotatable around a first rotation axis, the first arm including a first leg extending in a direction perpendicular to an axial direction of the first rotation axis and a second leg extending in a direction parallel to the axial direction of the first rotation axis, the first leg and the second leg forming a single monolithic part;

a second arm which is provided on the first arm so as to be rotatable around a second rotation axis having an axial direction different from the axial direction of the first rotation axis; and
a third arm, which is provided on the second arm so as to be rotatable around a third rotation axis having an axial direction different from the axial direction of the first rotation axis,
wherein when an angle formed by the first arm and the second leg of the second arm is set as 0° and an axis extending a length of the second arm overlaps an axis extending a length of the second leg of the first arm, when seen in the axial direction of the second rotation axis,
the second arm does not interfere with the first leg of the first arm and the third arm is closer to the first rotation axis than the second arm.

2. A robot comprising:
a base;
a first arm which is provided on the base so as to be rotatable around a first rotation axis, the first arm including a first leg extending in a direction perpendicular to an axial direction of the first rotation axis and a second leg extending in a direction parallel to the axial direction of the first rotation axis, the first leg and the second leg forming a single monolithic part; and
a second arm which is provided on the first arm so as to be rotatable around a second rotation axis having an axial direction different from the axial direction of the first rotation axis,
wherein an axis extending a length of the second arm overlaps an axis extending a length of the second leg of the first arm when seen in the axial direction of the second rotation axis.

3. The robot according to claim 1,
wherein the second rotation axis is separate from the first rotation axis.

4. The robot according to claim 1, further comprising:
the third arm, which is provided on the second arm so as to be rotatable around the third rotation axis.

5. The robot according to claim 4,
wherein an axial direction of the third rotation axis and an axial direction of the second rotation axis are parallel with each other.

6. The robot according to claim 4,
wherein the third arm has a length which is greater than the length of the second arm.

7. The robot according to claim 4,
wherein the second arm and the third arm are overlapping each other when seen in the axial direction of the second rotation axis.

8. The robot according to claim 4,
wherein the base is provided on a ceiling.

9. The robot according to claim 4,
wherein the third arm includes:
a first link which is provided on the second arm so as to be rotatable around the third rotation axis;
a second link which is provided on the first link so as to be rotatable around a fourth rotation axis having an axial direction which is different from an axial direction of the third rotation axis;
a third link which is provided on the second link so as to be rotatable around a fifth rotation axis having an axial direction which is different from an axial direction of the fourth rotation axis; and
a fourth link which is provided on the third link so as to be rotatable around a sixth rotation axis having an axial direction which is different from an axial direction of the fifth rotation axis.

* * * * *